(12) United States Patent
Yoshida et al.

(10) Patent No.: US 10,724,963 B2
(45) Date of Patent: Jul. 28, 2020

(54) DEVICE AND METHOD FOR CALCULATING AREA TO BE OUT OF INSPECTION TARGET OF INSPECTION SYSTEM

(71) Applicant: FANUC CORPORATION, Yamanashi (JP)

(72) Inventors: Junichirou Yoshida, Yamanashi (JP); Fumikazu Warashina, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/926,558

(22) Filed: Mar. 20, 2018

(65) Prior Publication Data

US 2018/0275073 A1 Sep. 27, 2018

(30) Foreign Application Priority Data

Mar. 21, 2017 (JP) .................. 2017-054628

(51) Int. Cl.
*G01N 21/88* (2006.01)
*G06T 7/00* (2017.01)
*B25J 9/16* (2006.01)
*G01N 21/95* (2006.01)

(52) U.S. Cl.
CPC ........ *G01N 21/8851* (2013.01); *B25J 9/1671* (2013.01); *G06T 7/001* (2013.01); *G06T 7/0004* (2013.01); *G01N 21/9515* (2013.01); *G01N 2021/889* (2013.01); *G06T 2207/10024* (2013.01); *G06T 2207/30164* (2013.01)

(58) Field of Classification Search
CPC .......... G01N 21/8851; G01N 2021/889; G06T 7/001; G06T 7/0004; G06T 2207/10024; G06T 2207/30164
USPC ............................................ 348/92
See application file for complete search history.

(56) References Cited

U.S. PATENT DOCUMENTS

| 5,321,767 A * | 6/1994 | Murase ............... G06T 7/70 348/130 |
| 7,782,451 B2 | 8/2010 | Matsumoto et al. |
| 9,774,827 B2 * | 9/2017 | Tanaka ............... B25J 9/1689 |
| 9,885,669 B2 * | 2/2018 | Cho ............... G01B 11/0608 |
| 2002/0054703 A1 * | 5/2002 | Hiroi ............... G01N 21/9501 382/149 |

(Continued)

FOREIGN PATENT DOCUMENTS

| CN | 101034070 A | 9/2007 |
| CN | 102959355 A | 3/2013 |

(Continued)

*Primary Examiner* — Richard A Hansell, Jr.
(74) *Attorney, Agent, or Firm* — Hauptman Ham, LLP

(57) ABSTRACT

A device capable of easily defining an area other than a surface to be inspected of a workpiece. The device includes a drawing acquisition section for acquiring drawing data of the workpiece; a designation reception section for receiving specification of the surface to be inspected of the workpiece in the drawing data; and a non-inspection area calculation section for calculating, as a non-inspection area, an image area other than the surface to be inspected in an image in a view of the imaging section when the workpiece and the imaging section are positioned at an imaging position at which at least a part of the surface to be inspected as specified falls within the view of the imaging section.

9 Claims, 25 Drawing Sheets

(56) References Cited

U.S. PATENT DOCUMENTS

| | | | |
|---|---|---|---|
| 2006/0181236 A1* | 8/2006 | Brogardh | B25J 9/1671 318/568.1 |
| 2011/0282492 A1* | 11/2011 | Krause | B25J 9/1664 700/259 |
| 2012/0201448 A1* | 8/2012 | Nammoto | G06T 7/0008 382/153 |
| 2014/0009601 A1* | 1/2014 | Cho | G01B 11/0608 348/126 |
| 2014/0314281 A1 | 10/2014 | Kojima et al. | |
| 2016/0332297 A1* | 11/2016 | Sugaya | B25J 9/161 |
| 2016/0379357 A1* | 12/2016 | Takazawa | G06T 7/0004 348/86 |

FOREIGN PATENT DOCUMENTS

| | | |
|---|---|---|
| CN | 103313921 A | 9/2013 |
| DE | 102004007829 A1 | 9/2005 |
| JP | 07-063537 A | 3/1995 |
| JP | H7-301609 A | 11/1995 |
| JP | 2009-97922 A | 5/2009 |
| JP | 2016-224707 A | 12/2016 |
| JP | 2017-15396 A | 1/2017 |

* cited by examiner (a)

DEVICE AND METHOD FOR CALCULATING AREA TO BE OUT OF INSPECTION TARGET OF INSPECTION SYSTEM

RELATED APPLICATIONS

The present application claims priority to Japanese Patent Application Number 2017-054628, filed on Mar. 21, 2017, the disclosure of which is hereby incorporated by reference herein in its entirety.

BACKGROUND OF THE INVENTION

1. Field of the Invention

The present invention relates to a device for calculating an area which is out of an inspection target of an inspection system for inspecting a surface of a workpiece, and a method for calculating an area which is out of an inspection target.

2. Description of the Related Art

Inspection systems for inspecting a scratch and the like on a surface of a workpiece have been known (e.g., Japanese Unexamined Patent Publication (Kokai) No. H7-63537).

In such inspection systems as described above, when a surface of a workpiece is inspected, the surface is captured by an imaging section, and from an image as captured, a scratch and the like are detected. In this case, it is possible that in the image as captured, there exists an area other than a surface which is to be inspected. Hitherto, a technique capable of easily defining such an area other than a surface to be inspected has been demanded.

SUMMARY OF INVENTION

In an aspect of the invention, a device, which is configured to calculate an image area to be out of an inspection target of an inspection system for inspecting a workpiece surface wherein the inspection system includes an imaging section configured to image a workpiece and a movement mechanism configured to move the workpiece or the imaging section so as to move the workpiece and the imaging section relative to each other, includes a drawing acquisition section configured to acquire drawing data of the workpiece; a designation reception section configured to receive designation of a surface to be inspected of the workpiece in the drawing data; and a non-inspection area calculation section configured to calculate, as a non-inspection area, an image area other than the surface to be inspected in an image within a field of view of the imaging section when the workpiece and the imaging section are positioned at an imaging position at which at least a part of the designated surface to be inspected is within the field of view of the imaging section.

In another aspect of the invention, a method of calculating an area to be out of an inspection target of an inspection system for inspecting a workpiece surface, the inspection system including an imaging section configured to image a workpiece and a movement mechanism configured to move the workpiece or the imaging section so as to position the workpiece and the imaging section relative to each other, includes acquiring drawing data of the workpiece; receiving designation of a surface to be inspected of the workpiece in the drawing data; and calculating, as a non-inspection area, an image area other than the surface to be inspected in an image within a field of view of the imaging section when the workpiece and the imaging section are positioned at an imaging position at which at least a part of the designated surface to be inspected is within the field of view of the imaging section.

According to an aspect of this disclosure, a non-inspection area which is unrequired to be inspected by the inspection system can be calculated from the drawing data of the workpiece. Thereby, a non-inspection area can be automatically calculated when the surface to be inspected is inspected, and consequently an operation of manually setting a non-inspection area for each view of the imaging section by an operator can be omitted.

BRIEF DESCRIPTION OF THE DRAWINGS

Objects, features, and advantages of the invention will be clarified from the description of embodiments described below in conjunction with the accompanying drawings, in which.

DETAILED DESCRIPTION

Figure 1:
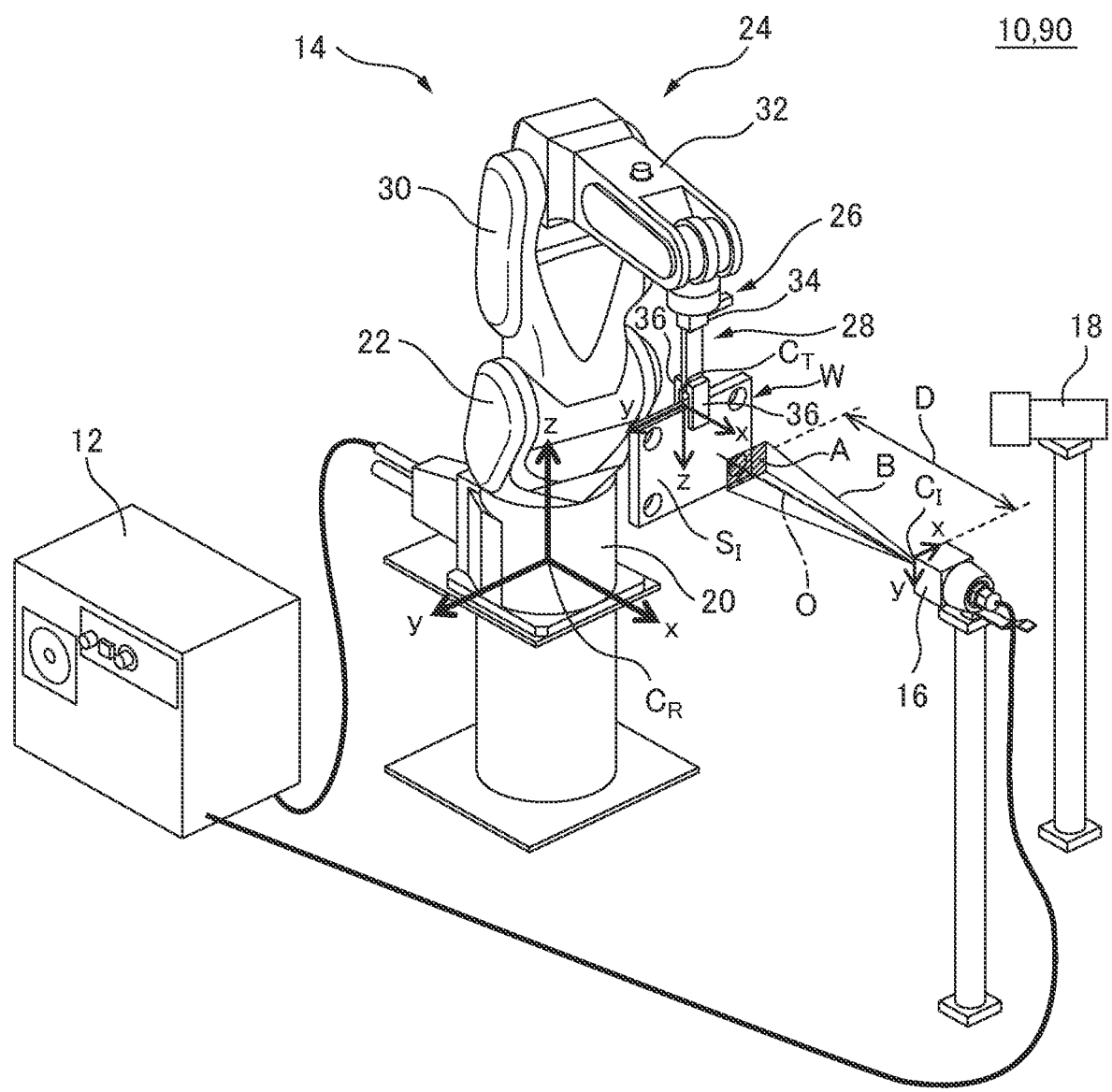
FIG. 1 is a perspective view of an inspection system according to an embodiment.

Hereinafter, embodiments of this disclosure will be described in detail with reference to the drawings. Note that, in the various embodiments as described below, similar elements are assigned the same reference numerals, and the overlapping description thereof will be omitted. First, with reference to FIGS. 1 to 3, an inspection system 10 according to an embodiment will be described.

Figure 2:
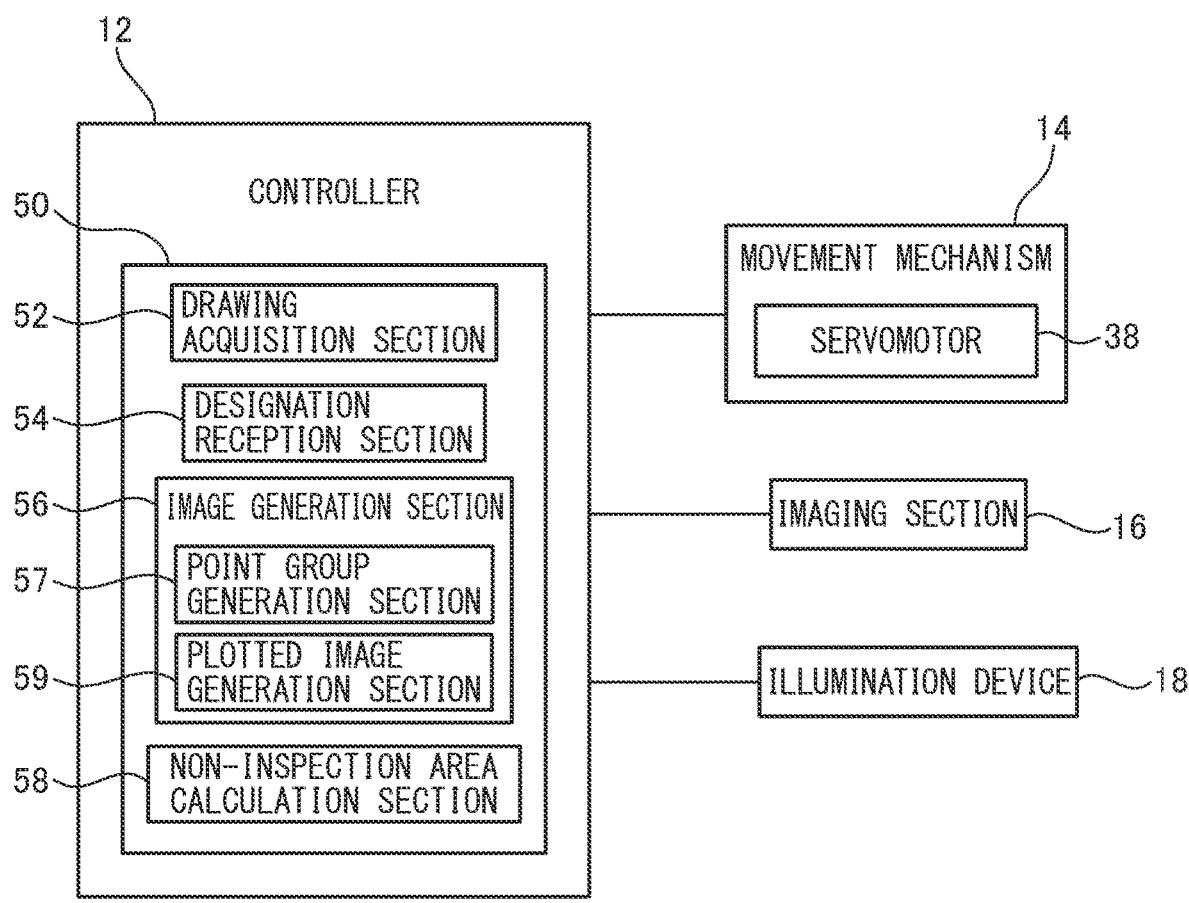
FIG. 2 is a block diagram of the inspection system as illustrated in FIG. 1.

The inspection system 10 includes a controller 12, a movement mechanism 14, an imaging section 16, an illumination device 18, and a device 50 (FIG. 2). The controller 12 includes e.g. a CPU and storage (unillustrated), and controls the movement mechanism 14, the imaging section 16, and the illumination device 18.

In this embodiment, the movement mechanism 14 is a vertical articulated robot, and includes a robot base 20, a rotary barrel 22, a robot arm 24, a wrist 26, and a robot hand 28. The robot base 20 is fixed on a floor of a work cell. The rotary barrel 22 is provided at the robot base 20 so as to be rotatable about a vertical axis.

The robot arm 24 includes an upper arm 30 rotatably coupled to the rotary barrel 22 and a forearm 32 rotatably coupled to a distal end of the upper arm 30. The wrist 26 is mounted to a distal end of the forearm 32, and supports the robot hand 28 so as to be rotatable about three axes.

Figure 3:
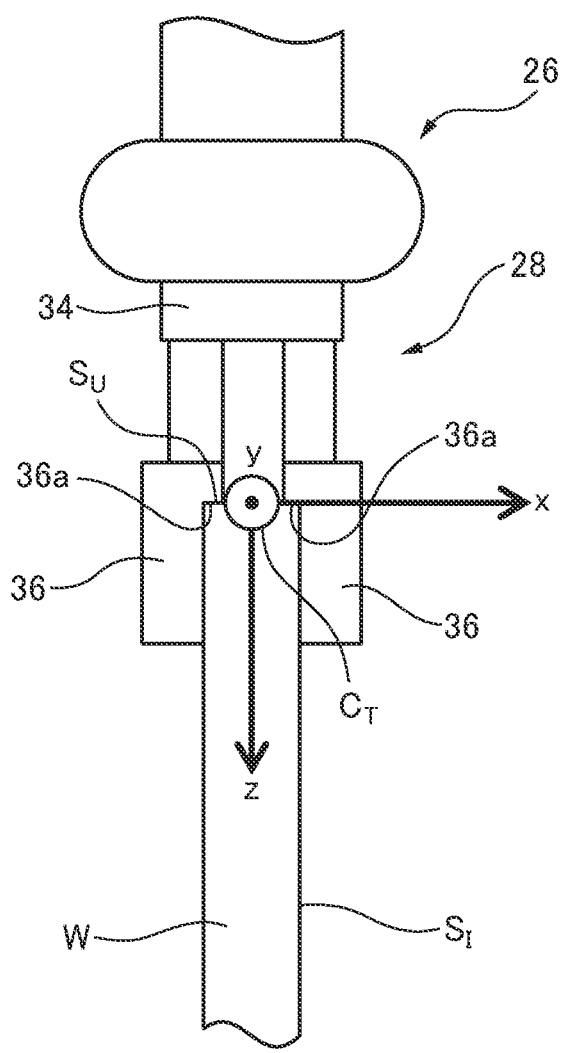
FIG. 3 is an enlarged view of a robot hand as illustrated in FIG. 1 and is a view in which the robot hand is seen from a y-axis positive direction of a tool coordinate system.

As illustrated in FIG. 3, the robot hand 28 includes a hand base 34, a plurality of fingers 36, and a finger drive section (unillustrated). The hand base 34 is coupled to the wrist 26. The plurality of fingers 36 are provided at the hand base 34 so as to open and close.

The plurality of fingers 36 extend from the hand base 34 in one direction, and include steps 36a on faces facing each other. When the robot hand 28 grips a workpiece W, an upper surface $S_U$ of the workpiece W engages the steps 36a. The finger drive section is e.g. an air cylinder, and built in the hand base 34. The finger drive section opens and closes the fingers 36 in accordance with a command from the controller 12.

The movement mechanism 14 includes a plurality of servomotors 38 (FIG. 2). The servomotors 38 are respectively built in the rotary barrel 22, the robot arm 24, and the wrist 26 of the movement mechanism 14, and drive these components in accordance with commands (speed commands, torque commands, etc.) from the controller 12.

A robot coordinate system $C_R$ (FIG. 1) is set as one of coordinate systems of an automatic control for controlling each component of the movement mechanism 14. The controller 12 operates each component of the movement mechanism 14 with reference to the robot coordinate system $C_R$. For example, the z-axis of the robot coordinate system $C_R$ is parallel to the vertical direction of a real space, wherein the rotary barrel 22 is rotated about the z-axis of the robot coordinate system $C_R$.

A tool coordinate system $C_T$ is set for the robot hand 28. The tool coordinate system $C_T$ is one of coordinate systems of an automatic control, and defines a position and orientation of the robot hand 28 in a space by expressing in the robot coordinate system $C_R$ a position and direction of the tool coordinate system $C_T$.

As illustrated in FIG. 3, in this embodiment, the tool coordinate system $C_T$ is set such that the origin of the tool coordinate system $C_T$ is positioned between the steps 36a of the fingers 36, and the fingers 36 extend from the hand base 34 in the z-axis positive direction of the tool coordinate system $C_T$ so as to open and close in the x-axis direction of the tool coordinate system $C_T$.

The controller 12 operates the rotary barrel 22, the robot arm 24, and the wrist 26 in the robot coordinate system $C_R$ such that the position and orientation of the robot hand 28 coincide with those defined by the tool coordinate system $C_T$. In this way, the robot hand 28 is disposed at an arbitrary position and orientation in the robot coordinate system $C_R$.

The imaging section 16 includes an optical system such as a focus lens, and an image sensor such as a CCD sensor or a CMOS sensor. In this embodiment, the imaging section 16 is fixed at a predetermined position in the robot coordinate system $C_R$ so as to be separate away from the movement mechanism 14. The imaging section 16 images an object such as the workpiece W in accordance with a command from the controller 12, and transmits the captured image to the controller 12.

The fixed position and an optical axis O (i.e., an optical path of a subject image which enters the optical system of the imaging section 16) of the imaging section 16 are expressed by coordinates in the robot coordinate system $C_R$, and pre-stored in the storage of the controller 12. Thereby, the controller 12 can identify the positions of the imaging section 16 and the optical axis O in the robot coordinate system $C_R$.

The illumination device 18 includes e.g. an incandescent lamp, a fluorescent lamp, or an LED, and is fixed at a predetermined position. The illumination device 18 is turned ON/OFF in accordance with a command from the controller 12, and irradiates light to the workpiece W gripped by the movement mechanism 14 while being turned ON.

Figure 4:
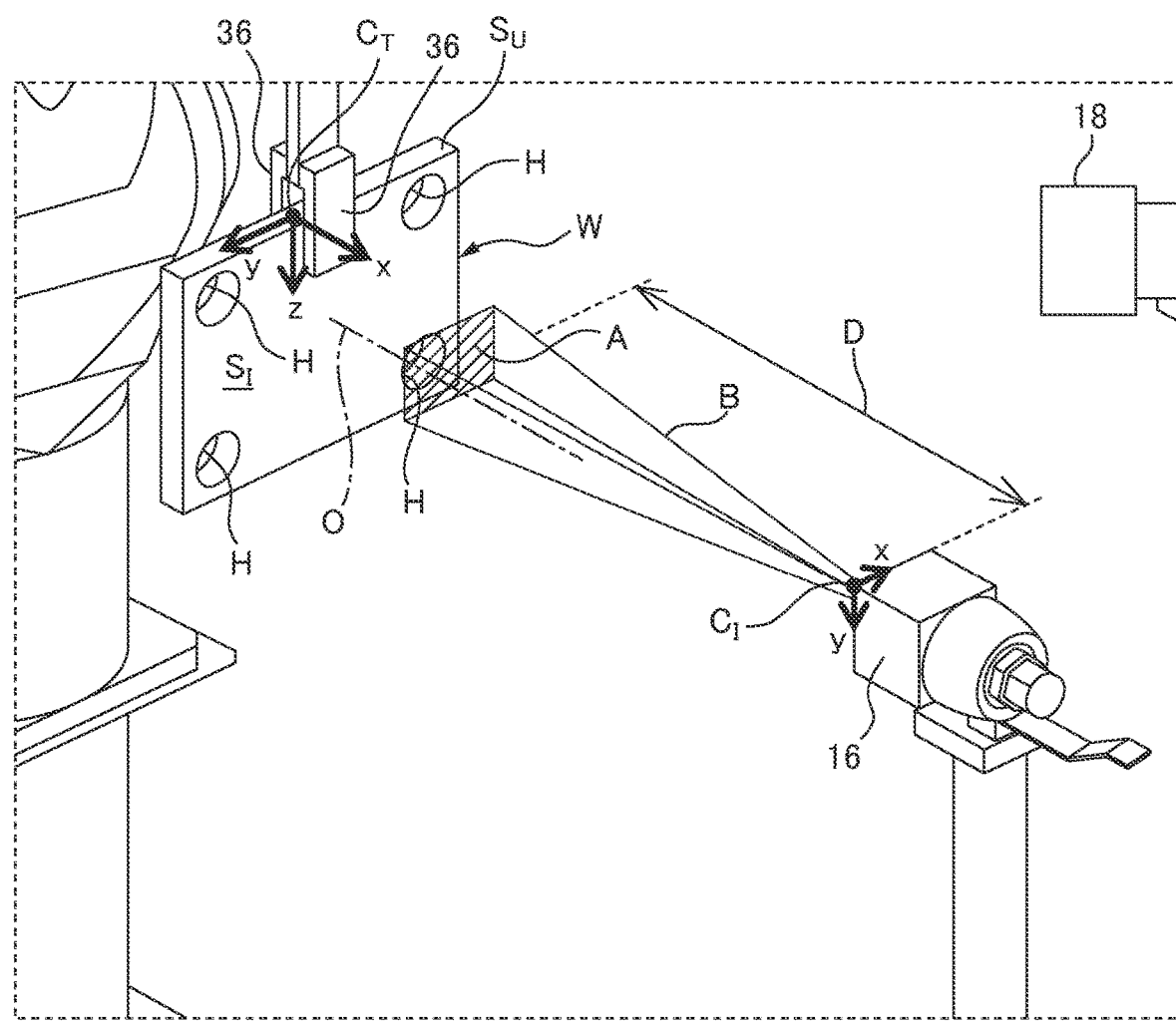
FIG. 4 is an enlarged view in which an imaging section and a workpiece of FIG. 1 are enlarged.
Figure 5:
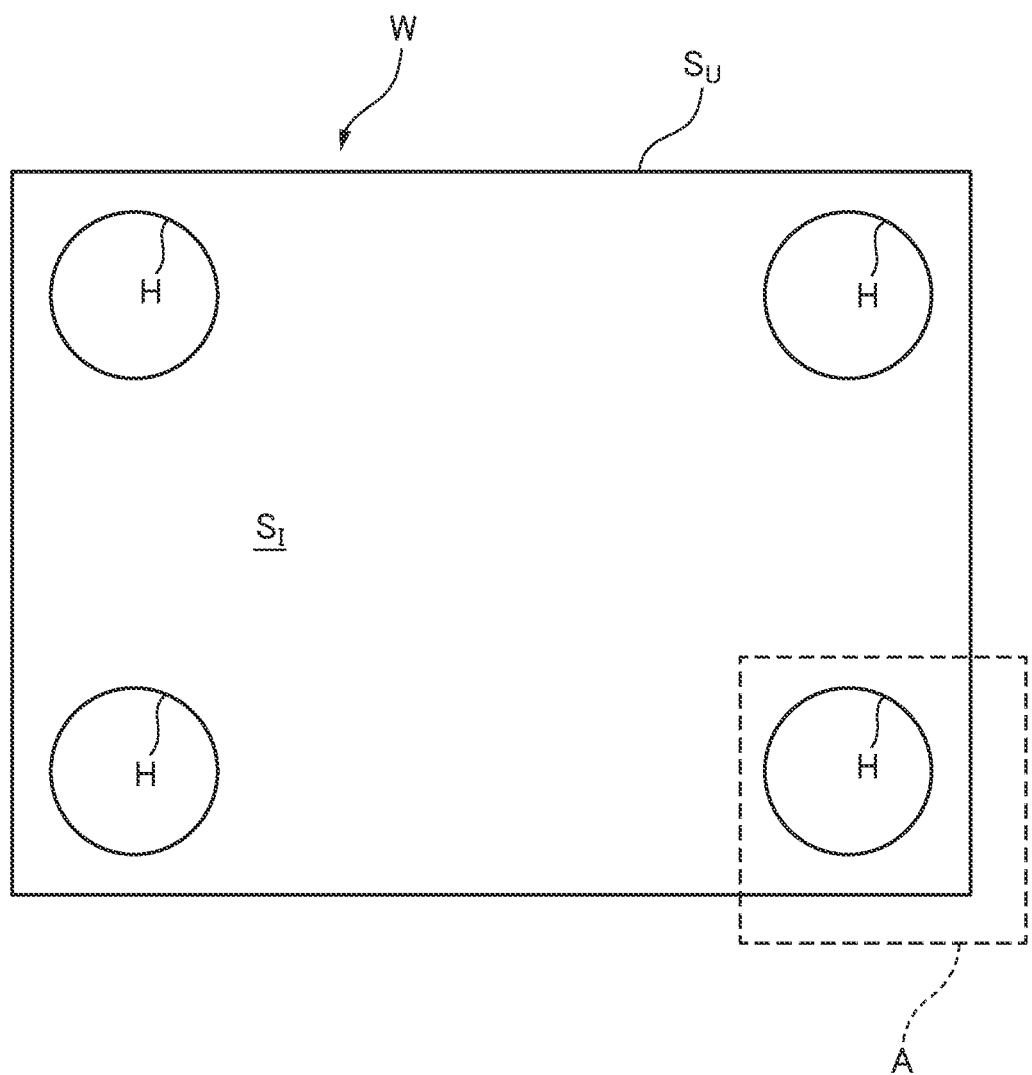
FIG. 5 is a diagram illustrating a view on a surface to be inspected when a workpiece and the imaging section are positioned at a first imaging position.

Next, with reference to FIGS. 1 to 7, an outline of an operation of inspecting a surface $S_I$ to be inspected of the workpiece W by the inspection system 10 will be described. As illustrated in FIGS. 4 and 5, in this embodiment, the workpiece W is a rectangular plate member, and has a total of four holes H.

When the surface $S_I$ of the workpiece W is inspected, the controller 12 first operates the movement mechanism 14 so as to grip the workpiece W stored in a predetermined storage area by the robot hand 28. At this time, the robot hand 28 grips the workpiece W at a gripping position designated in advance. This gripping position will be described later.

Subsequently, the controller 12 operates the movement mechanism 14 so as to move the workpiece W to an imaging position, at which at least a part of the surface S1 to be inspected is within a field of view A of the imaging section 16, to position the workpiece W and the imaging section 16 relative to each other. The field of view A of the imaging section 16 will be described with reference to FIG. 4.

The imaging section 16 has a view angle indicative of a range able to be imaged by the imaging section 16. The view angle depends on the specifications of the optical system and the image sensor of the imaging section 16. Specifically, the longer a focal distance of a camera lens is or the smaller a light reception surface of the image sensor is, the narrower the view angle is.

An example of the view angle of the imaging section 16 is illustrated as a virtual line B in FIGS. 1 and 4. The view angle B and a distance D between the imaging section 16 and the surface $S_I$ define a range (i.e., the field of view A) on the surface $S_I$ able to be imaged by the imaging section 16 when the workpiece W and the imaging section 16 are positioned as illustrated in FIG. 1.

In other words, the field of view A indicates an area on the surface $S_I$ able to be imaged by the imaging section 16 in a state where the imaging section 16 focuses on this area when the imaging section 16 and the surface $S_I$ are disposed so as to be separate away from each other by the distance D. Note that, a resolution of an image captured by the imaging section 16 and the field of view A are in an inversely proportional relationship, in which the smaller the field of view A is, the higher the resolution of the captured image is.

After the robot hand 28 grips the gripping position of the workpiece W, the controller 12 operates the movement mechanism 14 so as to dispose the robot hand 28 at a first position and orientation as illustrated in FIG. 1.

Specifically, the controller 12 sets the tool coordinate system $C_T$ at a first position and direction (i.e., an origin position and a direction of each axis) as illustrated in FIG. 1. Then, the controller 12 operates the movement mechanism 14 so as to move the robot hand 28 holding the workpiece W such that the position and orientation of the robot hand 28 coincide with those defined by the tool coordinate system $C_T$ illustrated in FIG. 1.

As a result, the robot hand 28 is disposed at the first position and orientation, thereby the workpiece W gripped by the robot hand 28 is positioned at a first imaging position with respect to the imaging section 16. At this time, the field of view A of the imaging section 16 is disposed at a position as illustrated in FIGS. 1, 4, and 5 with respect to the surface $S_I$. Further, the optical axis O of the imaging section 16 is orthogonal to the surface $S_I$, and the imaging section 16 and the surface $S_I$ are separated away from each other by the distance D.

Then, the controller 12 transmits a command to the illumination device 18 so as to turn on the illumination device 18. Thereby, the workpiece W gripped by the movement mechanism 14 is illuminated by the illumination device 18.

Figure 6:
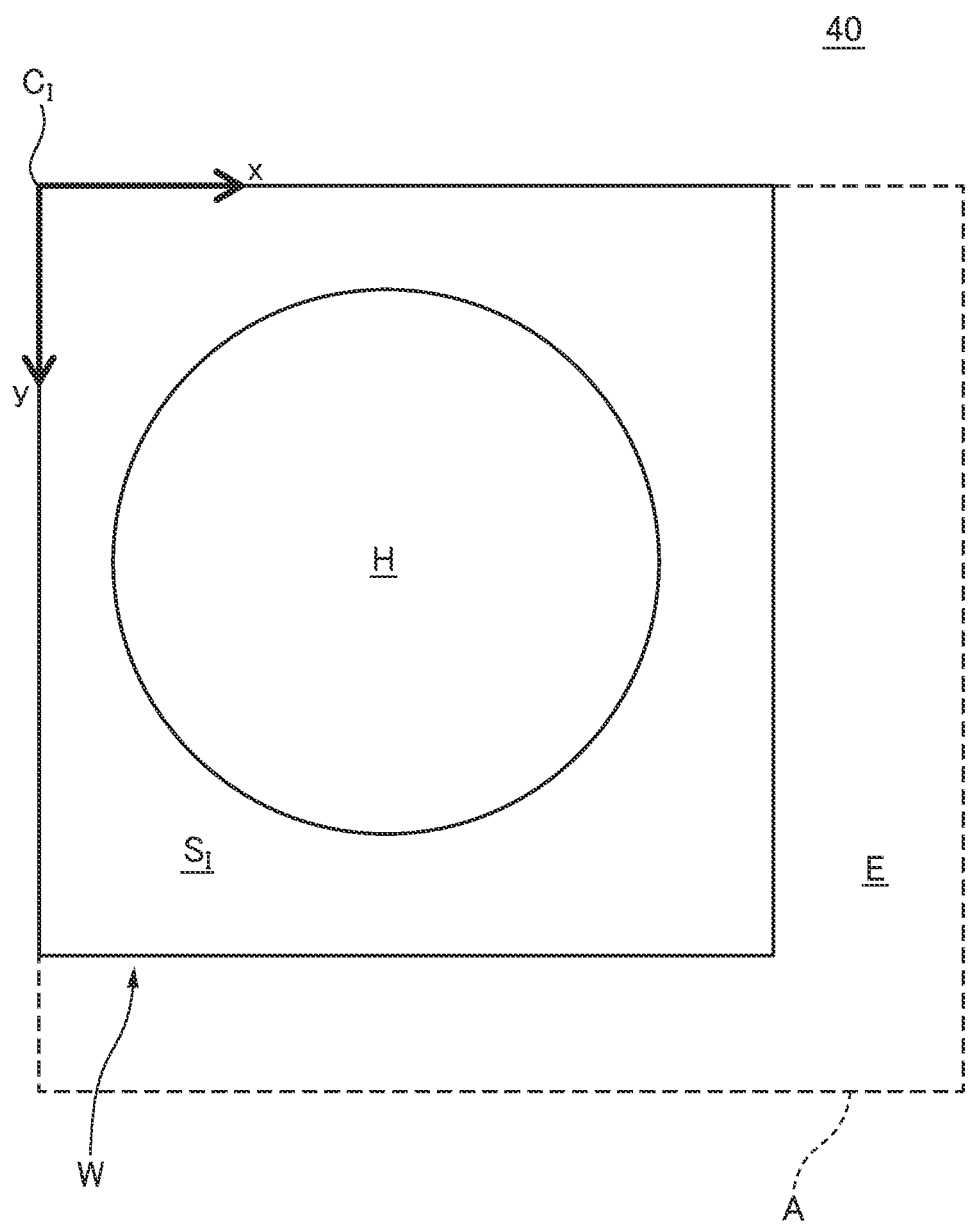
FIG. 6 illustrates an example of an image captured by the imaging section when the workpiece and the imaging section are positioned at the first imaging position.

Then, the controller 12 transmits an imaging command to the imaging section 16. When receiving the imaging command from the controller 12, the imaging section 16 images the surface $S_I$ of the workpiece W. FIG. 6 illustrates an example of an image captured by the imaging section 16 when the workpiece W and the imaging section 16 are positioned at the first imaging position.

The image 40 illustrated in FIG. 6 is an image within the field of view A of the imaging section 16 when the workpiece W and the imaging section 16 are positioned at the first imaging position (i.e., when the robot hand 28 gripping the workpiece W is disposed at the first position and orientation). Each pixel of the image 40 captured by the imaging section 16 is expressed by an imaging section coordinate system $C_I$ in FIG. 6. In other words, the imaging section coordinate system $C_I$ defines an x-y coordinate of each pixel of the image 40 captured by the imaging section 16.

The position and direction of the imaging section coordinate system $C_I$ (i.e., an origin position and a direction of each axis) in the robot coordinate system $C_R$ is determined from the fixed position, a visual line direction and a view angle of the imaging section 16 in the robot coordinate system $C_R$.

Then, the controller 12 operates the movement mechanism 14 so as to dispose the robot hand 28 gripping the workpiece W at a second position and orientation. When the robot hand 28 is disposed at the second position and orientation, the workpiece W gripped by the robot hand 28 is disposed at a second imaging position with respect to the imaging section 16. At this time, the field of view A of the imaging section 16 is disposed at a position indicated by an area $A_2$ in FIG. 7 with respect to the surface $S_I$.

When the workpiece W and the imaging section 16 are positioned at the second imaging position (i.e., when the robot hand 28 is disposed at the second position and orientation), the controller 12 transmits an imaging command to the imaging section 16 so as to image the surface $S_I$ of the workpiece W, and then the imaging section 16 transmits an captured image to the controller 12. Thereby, an image corresponding to the area $A_2$ in FIG. 7 is captured.

Figure 7:
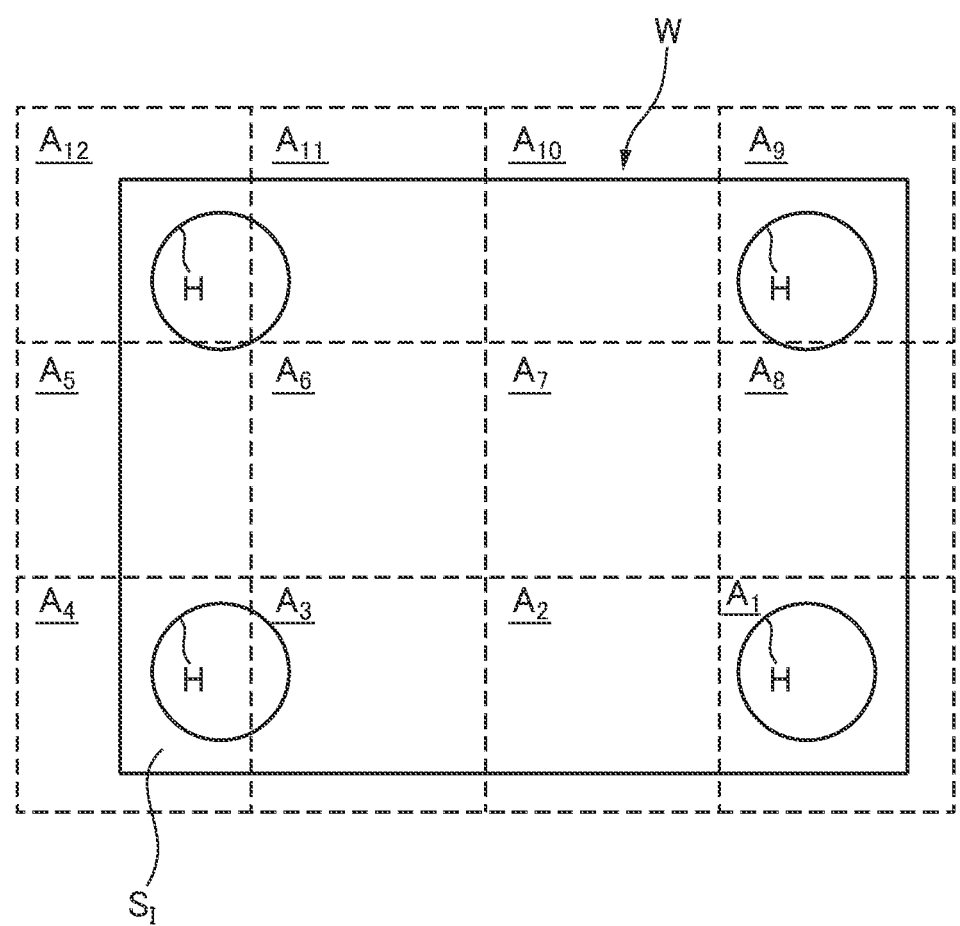
FIG. 7 is a diagram illustrating the view on the surface to be inspected when the workpiece and the imaging section are positioned at an n-th imaging position (n=1 to 12)

An area $A_n$ (n=1 to 12) in FIG. 7 denotes a position of the field of view A of the imaging section 16 with respect to the surface $S_I$ when the robot hand 28 gripping the workpiece W is disposed at the n-th position and orientation, whereby the workpiece W is disposed at the n-th imaging position with respect to the imaging section 16.

As illustrated in FIG. 7, the area $A_n$ and area $A_{n+1}$ are adjacent to each other such that a side of the area $A_n$ coincides with that of the area $A_{n+1}$. Note that, the n-th imaging position of the workpiece W and the imaging section 16 may be defined such that at least parts of two areas $A_n$ adjacent to each other overlap with each other.

When arranging the robot hand 28 at the n-th position and orientation, the controller 12 sets the tool coordinate system $C_T$ at the n-th position and direction. Then, the controller 12 operates the movement mechanism 14 so as to move the robot hand 28 such that the position and orientation of the robot hand 28 coincide with those defined by the tool coordinate system $C_T$ disposed at the n-th position and direction.

In this way, the controller 12 sequentially disposes the robot hand 28 at a third position and orientation, a fourth position and orientation, . . . and the n-th position and orientation, thereby sequentially positioning the workpiece W gripped by the robot hand 28 at a third imaging position, a forth imaging position, . . . and the n-th imaging position with respect to the imaging section 16. The controller 12 causes the imaging section 16 to image the surface $S_I$ of the workpiece W each time the workpiece W and the imaging section 16 are positioned at the respective imaging positions.

Thus, the controller 12 acquires a total of twelve images corresponding to areas $A_1$ to $A_{12}$ in FIG. 7. Then, the controller 12 analyzes each image acquired from the imaging section 16 so as to detect a defect on the surface $S_I$, such as a scratch formed on the surface $S_I$.

The controller 12 carries out a series of processes described above in accordance with a robot program. The robot program can be constructed by teaching to the movement mechanism 14 an operation of disposing the robot hand 28 at the n-th position and orientation with using a teach pendant (unillustrated) by an operator, for example.

Alternatively, the robot program can be constructed by automatically generating, on the basis of drawing data of the workpiece W, an operation of disposing the robot hand 28 at the n-th position and orientation by the movement mechanism 14.

The robot program includes information on the n-th position and direction of the tool coordinate system $C_T$ and on a rotation angle of each servomotor 38 of the movement mechanism 14 when the robot hand 28 is disposed at the n-th position and orientation.

As illustrated in FIG. 6, the image 40 captured by the imaging section 16 includes areas other than the surface $S_I$ to be inspected, such as the hole H of the workpiece W and an exterior space E outside of the workpiece W. Such areas H, E other than the surface $S_I$ to be inspected are image areas unnecessary to be inspected by the inspection system 10.

The device 50 according to this embodiment automatically calculates such image areas H, E to be out of an inspection target. As illustrated in FIG. 2, the device 50 includes a drawing acquisition section 52, a designation reception section 54, an image generation section 56, and a non-inspection area calculation section 58. The image generation section 56 includes a point group generation section 57 and a plotted image generation section 59.

Note that, in this embodiment, the device 50 is mounted in the controller 12. Accordingly, the controller 12 functions as the drawing acquisition section 52, the designation reception section 54, the image generation section 56 (the point group generation section 57 and the plotted image generation section 59), and the non-inspection area calculation section 58.

Figure 8:
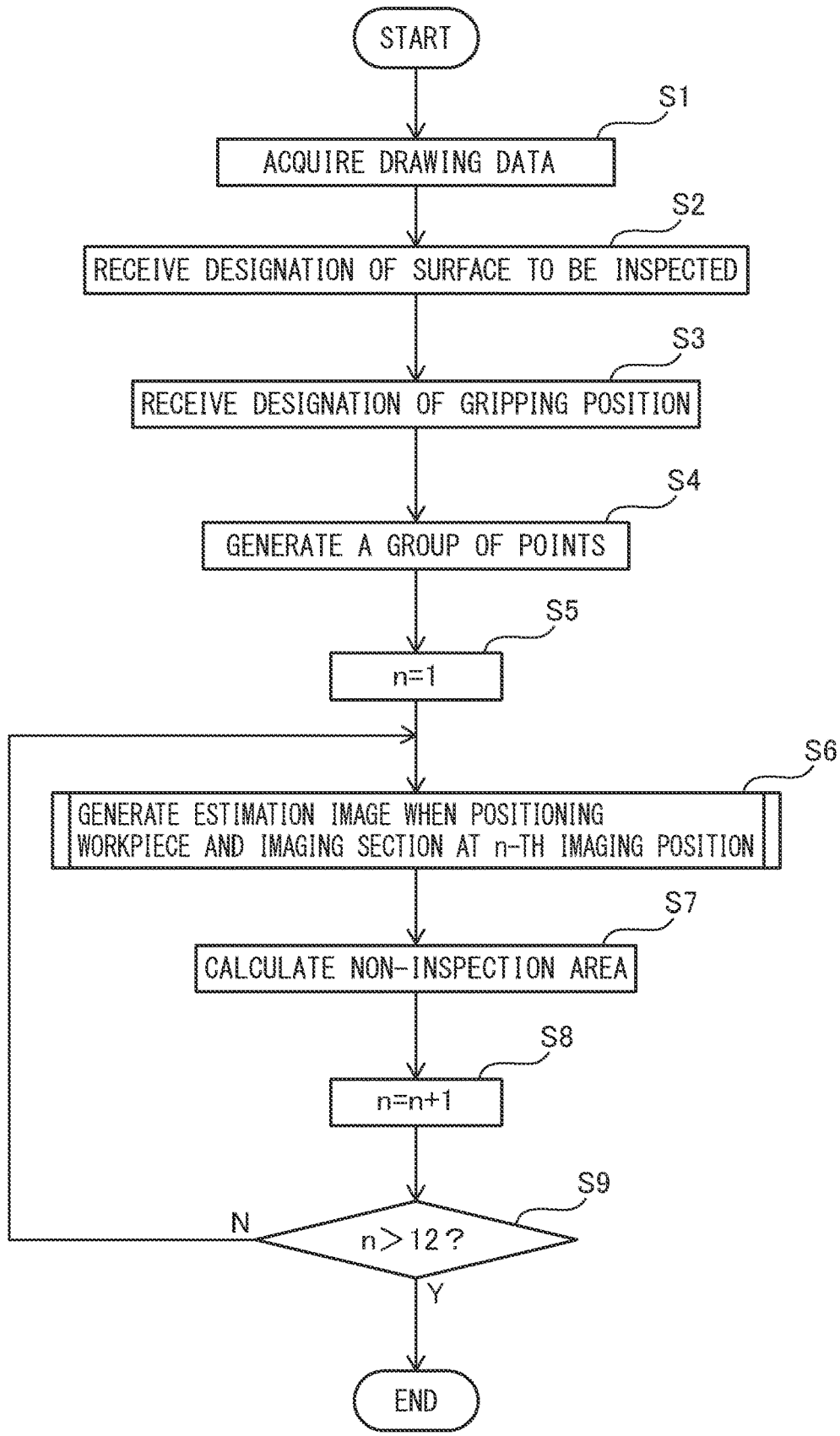
FIG. 8 is a flowchart illustrating an example of an operation flow of a device as illustrated in FIG. 1.

Hereinafter, with reference to FIGS. 8 to 12, an operation flow of the device 50 will be described. The flow illustrated in FIG. 8 is started when the controller 12 receives a non-inspection area calculation command from an operator.

At step S1, the controller 12 acquires drawing data (e.g., 2D or 3D CAD data) of the workpiece W. As an example, the drawing data of the workpiece W is stored in an external server installed outside of the controller 12 so as to be communicable with the controller 12. In this case, at step S1, the controller 12 accesses the external server and downloads therefrom the drawing data of the workpiece W.

As another example, the drawing data of the workpiece W is stored in an external memory, such as an EEPROM (registered trademark). In this case, the controller 12 includes an I/O port (e.g., a USB port) into which the external memory is detachably inserted. At this step S1, the operator inserts the external memory into the I/O port of the controller 12, and the controller 12 downloads from the eternal memory the drawing data of the workpiece W.

As still another example, the drawing data of the workpiece W is pre-stored in the storage of the controller 12. In this case, at this step S1, the controller 12 reads out the drawing data of the workpiece W from the storage.

Thus, in this embodiment, the controller 12 functions as the drawing acquisition section 52 configured to acquire the drawing data of the workpiece W. At this step S1, the controller 12 acquires, as the drawing data of the workpiece W, a workpiece model $W_M$ of 3D CAD data as illustrated in FIG. 9.

At step S2, the controller 12 receives designation of the surface $S_I$ to be inspected. As an example, the controller 12 is provided with a display such as a liquid crystal display (LCD) or an organic EL display, and an operation section, such as a keyboard or a touch panel.

Figure 9:
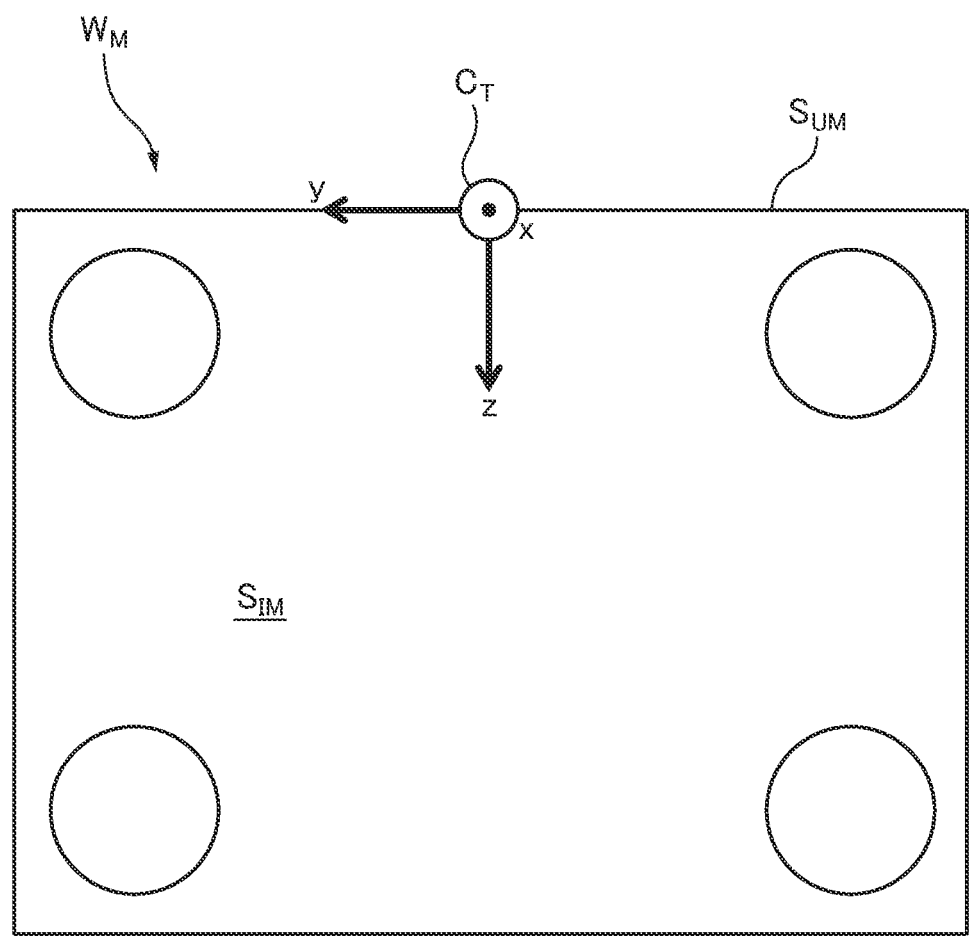
FIG. 9 illustrates drawing data of the workpiece.

The operator operates the operation section so as to designate a surface model $S_{IM}$ corresponding to the surface $S_I$ to be inspected in the workpiece model $W_M$ displayed in the display as illustrated in FIG. 9. The controller 12 receives the input to the operation section by the operator, thereby receives designation of the surface model $S_{IM}$.

Thus, in this embodiment, the controller 12 functions as the designation reception section 54 configured to receive designation of the surface $S_I$ (i.e., the surface model $S_{IM}$) to be inspected in the drawing data.

At step S3, the controller 12 receives from the operator designation of the gripping position when the robot hand 28 grips the workpiece W. The gripping position is determined by a position and direction of the tool coordinate system $C_T$ set by the controller 12 when the workpiece W is gripped by the robot hand 28. For example, the operator operates the operation section of the controller 12 so as to designate an origin position of the tool coordinate system $C_T$ in the workpiece model $W_M$ displayed in the display.

Assume that the operator designate the origin position of the tool coordinate system $C_T$ at the center of an upper surface model $S_{UM}$ of the workpiece model $W_M$, as illustrated in FIG. 9. In this case, when the workpiece W stored in the storage area is gripped by the robot hand 28, the controller 12 sets the tool coordinate system $C_T$ with respect to the workpiece W such that the origin of the tool coordinate system $C_T$ is positioned at the center of the upper surface $S_U$ of the workpiece W, and the y-z plane of the tool coordinate system $C_T$ is parallel to the surface $S_I$.

Then, the controller 12 operates the movement mechanism 14 so as to dispose the robot hand 28 at a position and orientation defined by the set tool coordinate system $C_T$ and grip the workpiece W by the robot hand 28.

As a result, the robot hand 28 grips the workpiece W at the gripping position corresponding to the tool coordinate system $C_T$ designated by an operator, as illustrated in FIGS. 1, 3, and 4. The controller 12 receives the input to the operation section by the operator and sets the origin of the tool coordinate system $C_T$ at the position in the workpiece model $W_M$ illustrated in FIG. 9.

Figure 10:
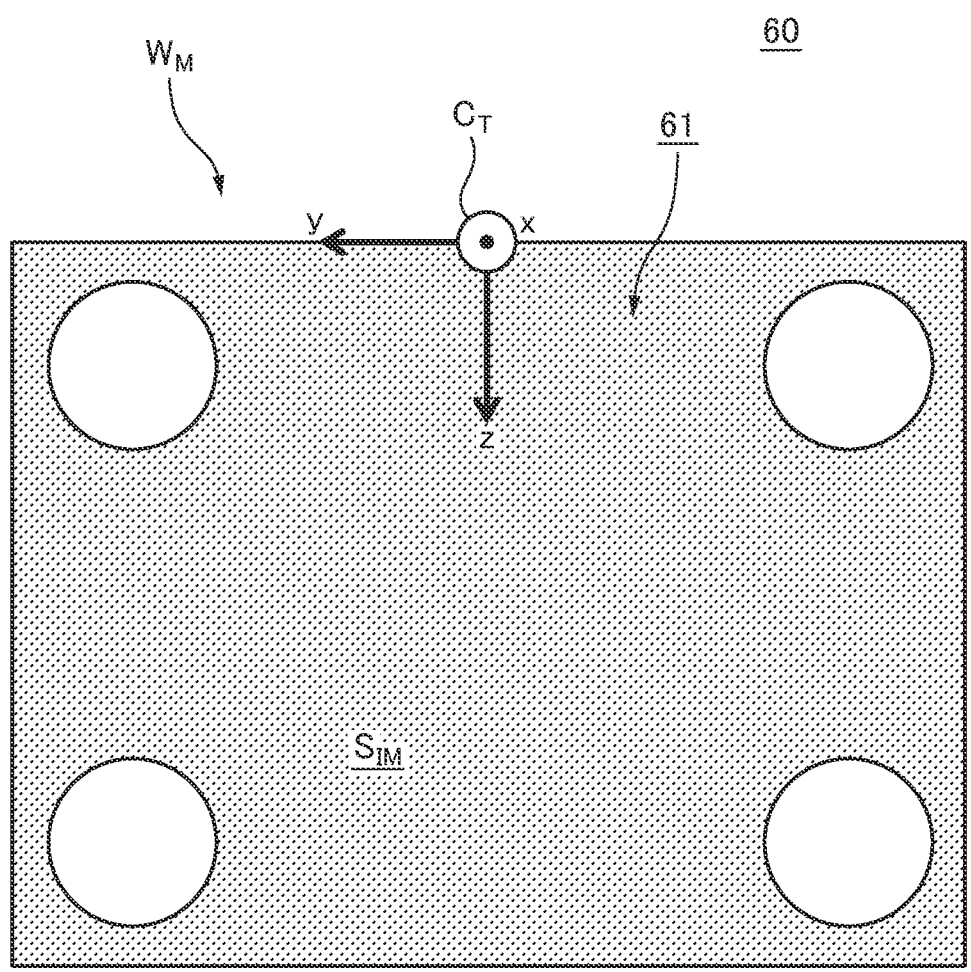
FIG. 10 illustrates an example of a point group generated at step S4 in FIG. 8.

At step S4, the controller 12 generates a group of points on the surface $S_I$ (i.e., the surface model $S_{IM}$) designated at step S2, on the basis of the drawing data acquired at step S1. FIG. 10 illustrates an example of an image in which a group of points is generated on the surface model $S_{IM}$.

In the image 60 illustrated in FIG. 10, a group of points 61 is generated on the surface model $S_{IM}$, and the group of points 61 includes a plurality of points uniformly dispersed on the surface model $S_{IM}$. Each of these points is expressed by coordinates in the tool coordinate system $C_T$ designated at step S3. In this way, the surface model $S_{IM}$ is expressed by the group of points 61.

Thus, in this embodiment, the controller 12 functions as the point group generation section 57 configured to generate the group of points 61 on the surface $S_I$ (i.e., the surface model $S_{IM}$) on the basis of the drawing data of the workpiece W.

At step S5, the controller 12 sets the number "n" of the n-th imaging position (i.e., the n-th position and orientation at which the robot hand 28 is disposed, and the n-th position and direction at which the tool coordinate system $C_T$ is set) to "1".

At step S6, the controller 12 generates, on the basis of the drawing data of the workpiece W (i.e., the workpiece model $W_M$), an estimation image which is estimated to be imaged by the imaging section 16 when the movement mechanism 14 positions the workpiece W at the n-th imaging position with respect to the imaging section 16.

This step S6 will be described with reference to FIG. 11. Hereinafter, a case is described where the number "n" of the n-th imaging position is set to "1" at the start of step S6.

At step S11, the controller 12 acquires information on the first position and direction of the tool coordinate system $C_T$ which is to be set when the workpiece W is positioned at the first imaging position with respect to the imaging section 16.

As described above, the positions and directions of the tool coordinate system $C_T$ are contained in the robot program constructed by e.g. teaching. At step S11, the controller 12 reads out from the storage the information on the first position and direction of the tool coordinate system $C_T$.

At step S12, the controller 12 calculates coordinate in the robot coordinate system $C_R$ of each point of the group of points 61 generated at step S4 when the tool coordinate system $C_T$ is arranged at the first position and direction. As described above in conjunction with FIG. 10, each point of the group of points 61 can be expressed as coordinate in the tool coordinate system $C_T$.

On the basis of the information on the first position and direction of the tool coordinate system $C_T$ acquired at step S11, the controller 12 transforms the coordinate in the tool coordinate system $C_T$ of each point of the group of points 61 when the tool coordinate system $C_T$ is arranged at the first position and direction into coordinate in the robot coordinate system $C_R$.

Specifically, the controller 12 multiplies the coordinate in the tool coordinate system $C_T$ of each point of the group of points 61 by a transformation matrix, thereby transforms the coordinate in the tool coordinate system $C_T$ of each point of the group of points 61 into that in the robot coordinate system $C_R$. This transformation matrix is a matrix (e.g., a Jacobian matrix) for transforming a coordinate of the tool coordinate system $C_T$ disposed at the first position and direction into that in the robot coordinate system.

In this way, the controller 12 calculates the coordinate in the robot coordinate system $C_R$ of each point of the group of points 61 when the tool coordinate system $C_T$ is arranged at the first position and direction. The thus-calculated coordinate of each point corresponds to coordinate in the robot coordinate system $C_R$ of each point of the group of points 61 when the group of points 61 is generated on the surface $S_I$ positioned as illustrated in FIGS. 1 and 4.

Then, the controller 12 assigns each point, the coordinate of which has been calculated, with the number "m". For example, if the total number of points, the coordinate of which has been calculated, is γ (=10,000), each point is numbered as m-th (m=1 to γ) point. At step S13, the controller 12 sets the number "m" assigned to the point to "1".

At step S14, the controller 12 transforms (i.e., projects) the coordinate of the m-th point of the group of points 61, the coordinate of which has been calculated at step S12, into coordinate in the imaging section coordinate system $C_I$.

Specifically, the controller 12 multiplies the coordinate of the m-th point calculated at step S12 by a transformation matrix, thereby transforms the coordinate in the robot coordinate system $C_R$ of the m-th point into that in the imaging section coordinate system $C_I$. This transformation matrix is a matrix (e.g., a Jacobian matrix) for transforming a coordinate in the robot coordinate system $C_R$ into that in the imaging section coordinate system $C_I$.

At step S15, the controller 12 determines whether or not the coordinate (x, y) in the imaging section coordinate system $C_I$ transformed at step S14 is within a predetermined range (e.g., $0 \leq x \leq \alpha$ and $0 \leq y \leq \beta$). This predetermined range defines the range of the field of view A of the imaging section 16. This predetermined range is determined depending on the specification of the imaging section 16, and stored in the storage of the controller 12.

When the controller 12 determines that the coordinate of the point is within the predetermined range (i.e., determines YES), it proceeds to step S16. On the other hand, when the controller 12 determines that the coordinate of the point is out of the predetermined range (i.e., determines NO), it proceeds to step S17.

At step S16, the controller 12 generates an image in which the coordinate in the imaging section coordinate system $C_I$ transformed at step S14 is plotted by a point. Thus, in this embodiment, the controller 12 functions as the plotted image generation section 59.

At step S17, the controller 12 increments the number "m" assigned to the point by "1" (i.e., m=m+1).

At step S18, the controller 12 determines whether or not the number "m" assigned to the point is greater than the total number "γ" of points. When the controller 12 determines that the number "m" is greater than "γ" (i.e., determines YES), it ends the flow illustrated in FIG. 11, and proceeds to step S7 in FIG. 8. On the other hand, when the controller 12 determines that the number "m" is equal to or less than "γ" (i.e., determines NO), it returns to step S14.

In this way, the controller 12 loops steps 14 to 18 until it determines YES at step S18, and generates the image in which the points of the group of points 61, which is within the range of the field of view A when transformed (projected) into the imaging section coordinate system $C_I$, are plotted.

Figure 12:
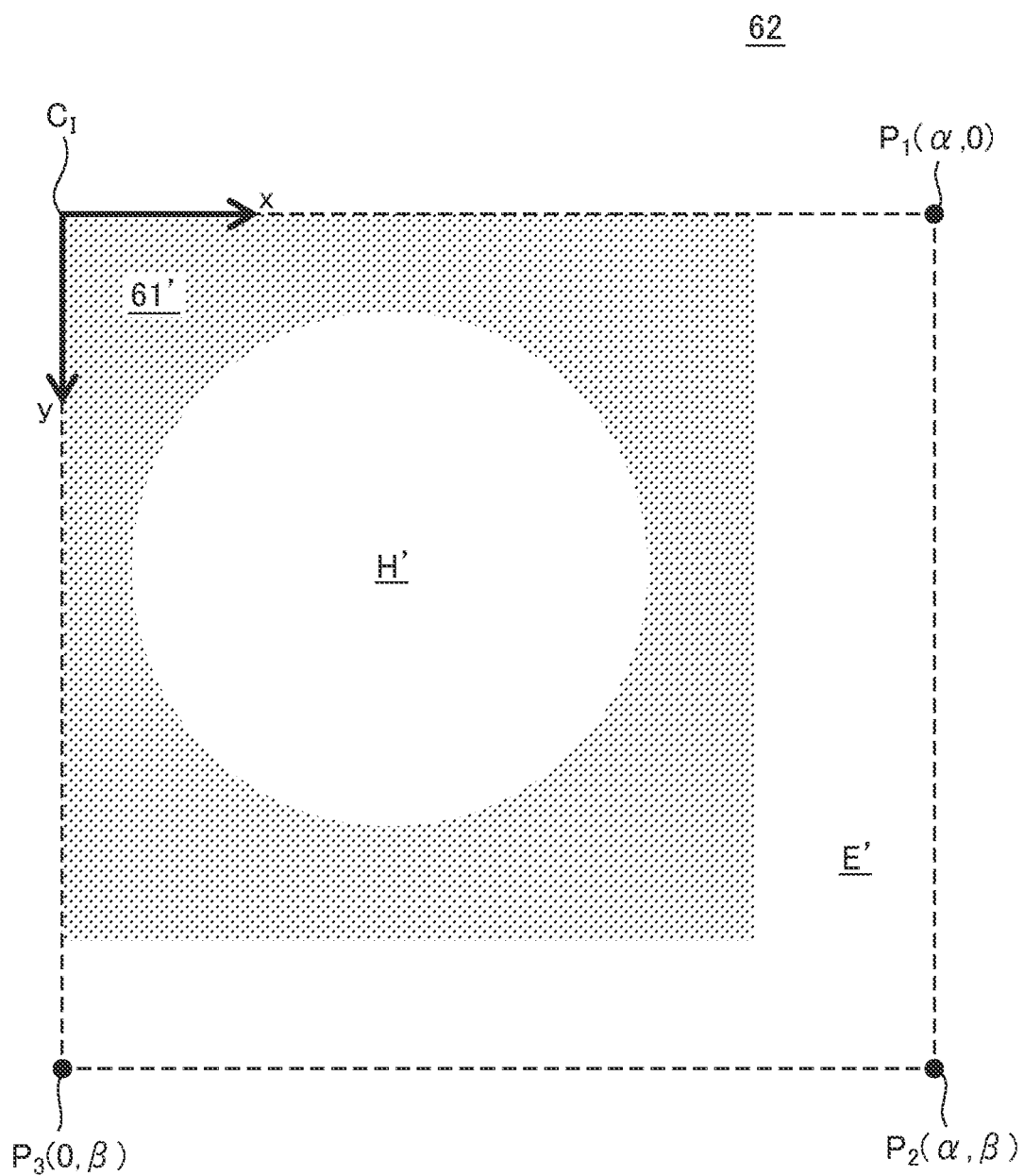
FIG. 12 illustrates an example of an estimation image generated by a series of the flow of step S6 as illustrated in FIG. 11.

FIG. 12 illustrates an example of the thus-generated image. The image 62 illustrated in FIG. 12 is an image (i.e., an estimation image) estimated to be imaged by the imaging section 16 when the workpiece W is positioned at the first imaging position with respect to the imaging section 16, and corresponds to the image of the field of view A illustrated in FIG. 6.

The estimation image 62 is defined by the origin of the imaging section coordinate system $C_I$, a point $P_1$ (α, 0), a point $P_2$ (α, β), and a point $P_3$ (0, β), and includes a group of points 61' obtained by transforming the group of points 61 into the imaging section coordinate system $C_I$.

Thus, the controller 12 functions as the point group generation section 57 to generate the group of points 61, and functions as the plotted image generation section 59 to plot each point of the group of points 61 into the imaging section coordinate system $C_I$, thereby generates the estimation image 62. Accordingly, the controller 12 functions as the image generation section 56 configured to generate the estimation image 62 on the basis of the drawing data of the workpiece W.

With reference to FIG. 8 again, at step S7, the controller 12 calculates a non-inspection area. Specifically, the controller 12 calculates, as the non-inspection area, an image area other than an area of the group of points 61' included in the estimation image 62 generated at step S6.

As illustrated in FIG. 12, in the estimation image 62, there are image areas H' and E' as the image area other than the area of the group of points 61'. The image area H' corresponds to the hole H illustrated in FIG. 6, while the image area E' corresponds to the exterior space E illustrated in FIG. 6.

For example, the controller 12 calculates the number of points of the group of points 61' per a unit region (e.g., a region of 10 pixels×10 pixels) in the estimation image 62, and determines that the unit region is the image area H', E' other than the group of points 61' when the number is equal to or less than a predetermined threshold value.

The controller 12 can calculate the image areas H' and E' by carrying out such operation over the entire estimation image 62. Thus, in this embodiment, the controller 12 functions as the non-inspection area calculation section 58 configured to calculate the image areas H' and E' as the non-inspection areas H' and E'.

At step S8, the controller 12 increments the number "n" of the n-th imaging position by "1" (i.e., n=n+1). At step S9, the controller 12 determines whether the number "n" is a value greater than "12".

When the controller 12 determines that the number "n" is greater than "12" (i.e., determines YES), it ends the flow illustrated in FIG. 8. On the other hand, when the controller 12 determines that the number "n" is equal to or less than "12" (i.e., determines NO), it returns to step S6.

In this way, the controller 12 loops steps S6 to S9 until it determines YES at step S9. Thereby, the controller 12 sequentially generates the estimation images within the field of view A of the imaging section 16, each of which corresponds to the area $A_n$ (n=1 to 12) in FIG. 7, and calculates the non-inspection area in each of the estimation images. Thus, the controller 12 calculates the non-inspection area for the n-th imaging position (i.e., the area $A_n$).

As described above, in this embodiment, the controller 12 calculates, from the drawing data of the workpiece W, the non-inspection areas H' and E' unnecessary to be inspected by the inspection system 10. According to this configuration, since the non-inspection areas H' and E' can be automatically calculated when the surface $S_I$ is inspected, it is possible to omit an operation in which the operator manually sets the non-inspection area for each field of view A. Accordingly, the number of processes necessary for starting up the inspection system 10 can be reduced.

Further, according to this embodiment, even if the imaging position at which the workpiece W and the imaging section 16 are positioned is changed, the non-inspection area can be automatically calculated in response to the changed imaging position. Accordingly, it is possible to omit an operation of modifying the setting of the non-inspection area each time the position and orientation of the movement mechanism 14 is changed.

Further, according to this embodiment, the estimation image 62 illustrated in FIG. 12 is generated on the basis of the parameters (e.g., the position and direction of the tool coordinate system $C_T$) used when the controller 12 disposes the robot hand 28 at the n-th position and orientation in the real space.

According to this configuration, it is possible to accurately match the areas H and E in the image 40 captured by the imaging section 16 in the real space when the surface $S_I$ is inspected with the non-inspection areas H' and E' in the estimation image 62 generated at step S16.

Figure 13:
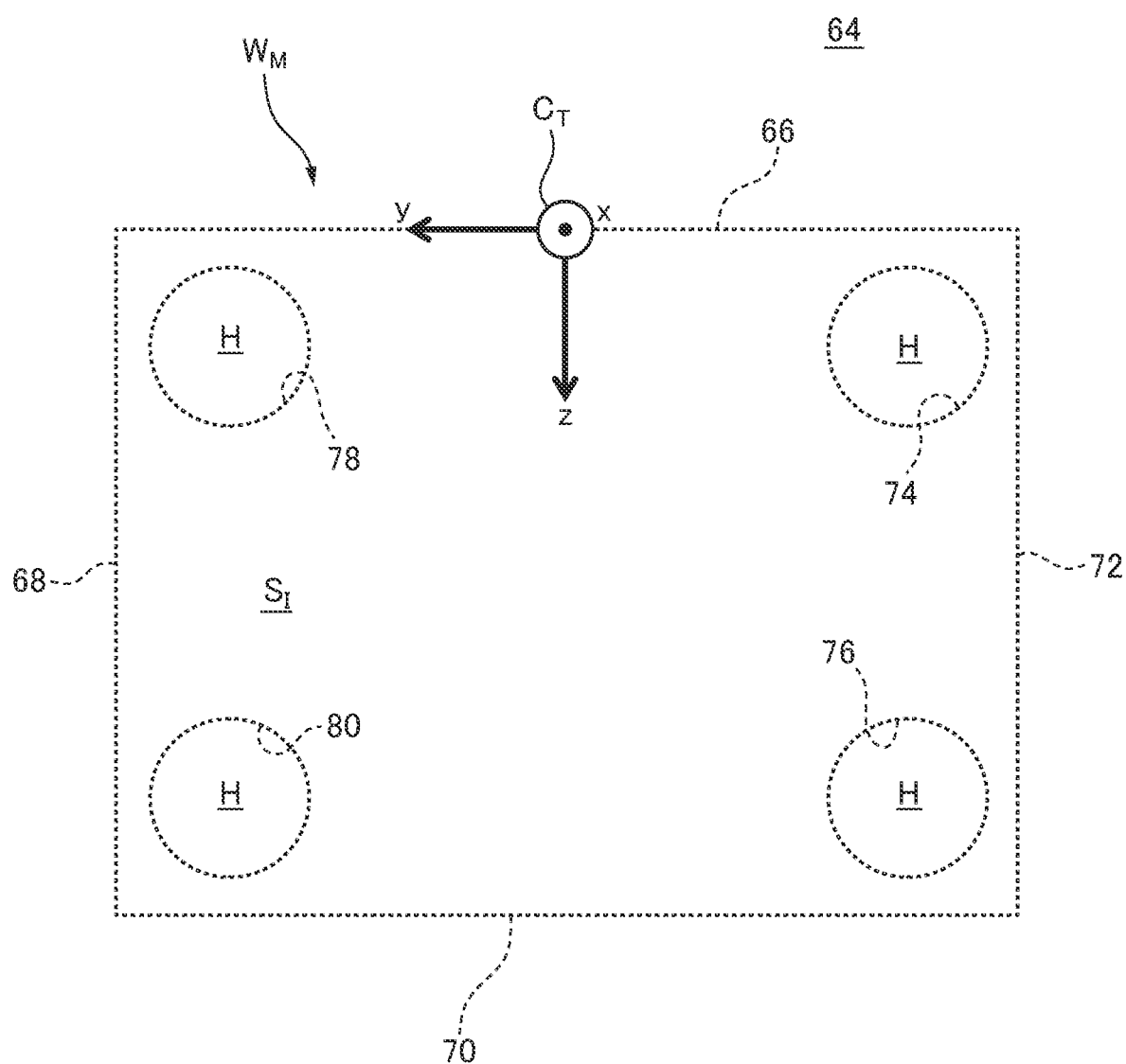
FIG. 13 illustrates an example of point groups according to another embodiment.

Note that, at the above-mentioned step S4, the controller 12 may generate a group of points only at edges of the surface $S_I$, based on the drawing data acquired at step S1. Such an image is illustrated in FIG. 13. In the image 64 illustrated in FIG. 13, groups of points are generated at edges 66, 68, 70, and 72 of the surface $S_I$ and wall surfaces 74, 76, 78, and 80 defining the holes H.

Figure 11:
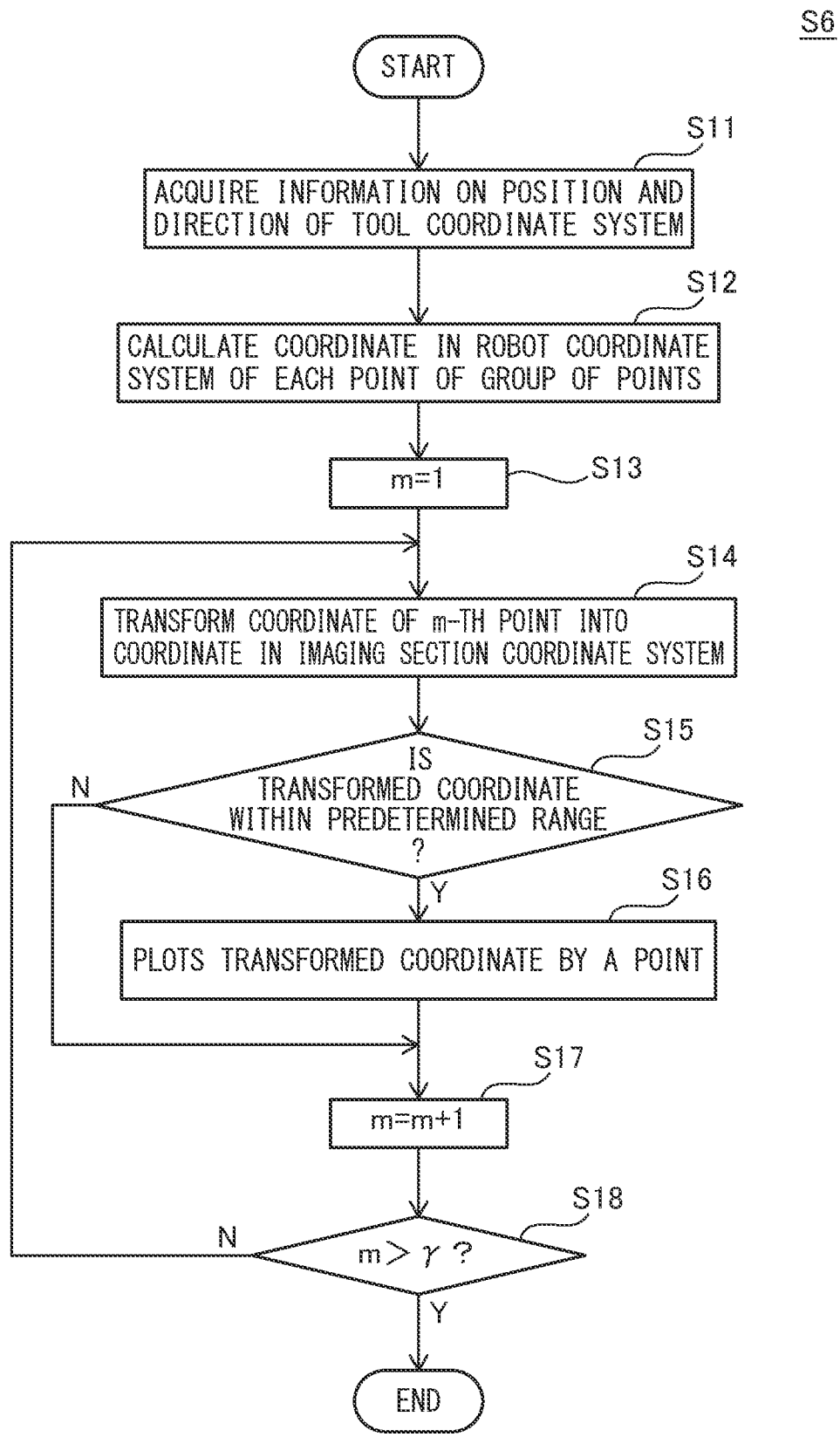
FIG. 11 is a flowchart illustrating an example of a flow of step S6 in FIG. 8.

In this embodiment, at step S12 in FIG. 11, the controller 12 calculates a coordinate in the robot coordinate system $C_R$ of each point of the groups of points 66, 68, 70, 72, 74, 76, 78, and 80 when the tool coordinate system $C_T$ is arranged at the n-th position and direction, and assigns each point, for which the coordinate has been calculated, with the number "m".

Then, at step S14, the controller 12 transforms (i.e., projects) the coordinate of the m-th point of the groups of points 66, 68, 70, 72, 74, 76, 78, and 80, for which the coordinates have been calculated at step S12, into that in the imaging section coordinate system $C_I$.

Figure 14:
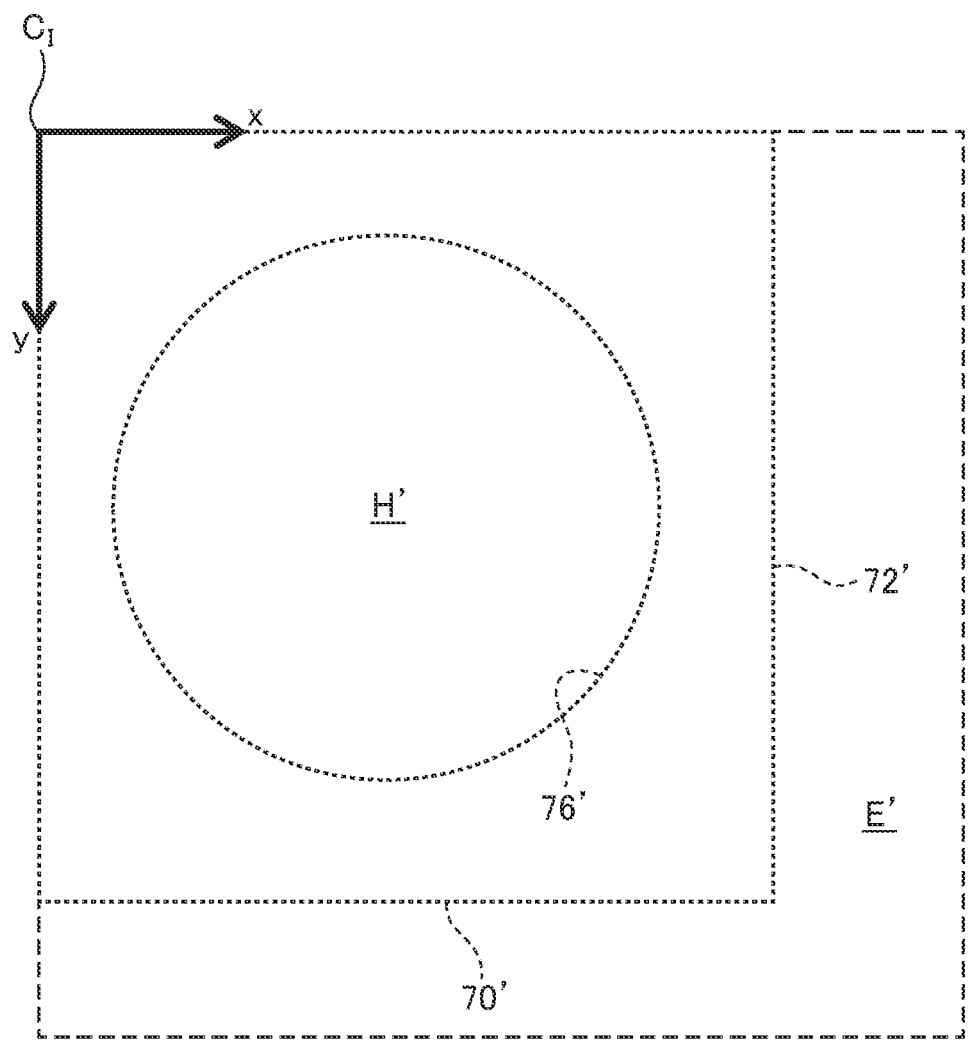
FIG. 14 illustrates an example of an estimation image generated at step S6 on the basis of the point groups as illustrated in FIG. 13.

Then, at step S16, the controller 12 generates an estimation image of the field of view A of the imaging section 16, and plots the coordinates in the imaging section coordinate system $C_I$ transformed at step S14 by points. FIG. 14 illustrates an example of the thus-generated estimation image.

Similarly to FIG. 12, the estimation image 82 illustrated in FIG. 14 corresponds to the image (FIG. 6) which is within the field of view A of the imaging section 16 when the workpiece W is positioned at the first imaging position with respect to the imaging section 16. The estimation image 82 illustrated in FIG. 14 includes groups of points 70' and 72' into which the groups of points 70 and 72 illustrated in FIG. 13 are transformed, and a group of points 76' into which the group of points 76 illustrated in FIG. 13 is transformed.

Then, at step S7 in FIG. 8, the controller 12 calculates the non-inspection areas H' and E' on the basis of the groups of points 70', 72' and 76' included in the estimation image 82. For example, at step S14, the controller 12 gives information (e.g., a flag) for identifying inner areas of the groups of points 74, 76, 78, and 80 in FIG. 13 as non-inspection areas to each point constituting the groups of points 74, 76, 78, and 80.

On the other hand, the controller 12 gives information (e.g., a flag) for identifying an inner area enclosed by the groups of points 66, 68, 70, and 72 as an area of the surface $S_I$ to be inspected to each point constituting the groups of points 66, 68, 70, and 72.

When the groups of points 66, 68, 70, 72, 74, 76, 78, and 80 are transformed at step S14, the controller 12 refers to the information given to the original groups of points 66, 68, 70, 72, 74, 76, 78, and 80, and can determine whether or not the areas defined by the transformed groups of points are the non-inspection areas.

Figure 15:
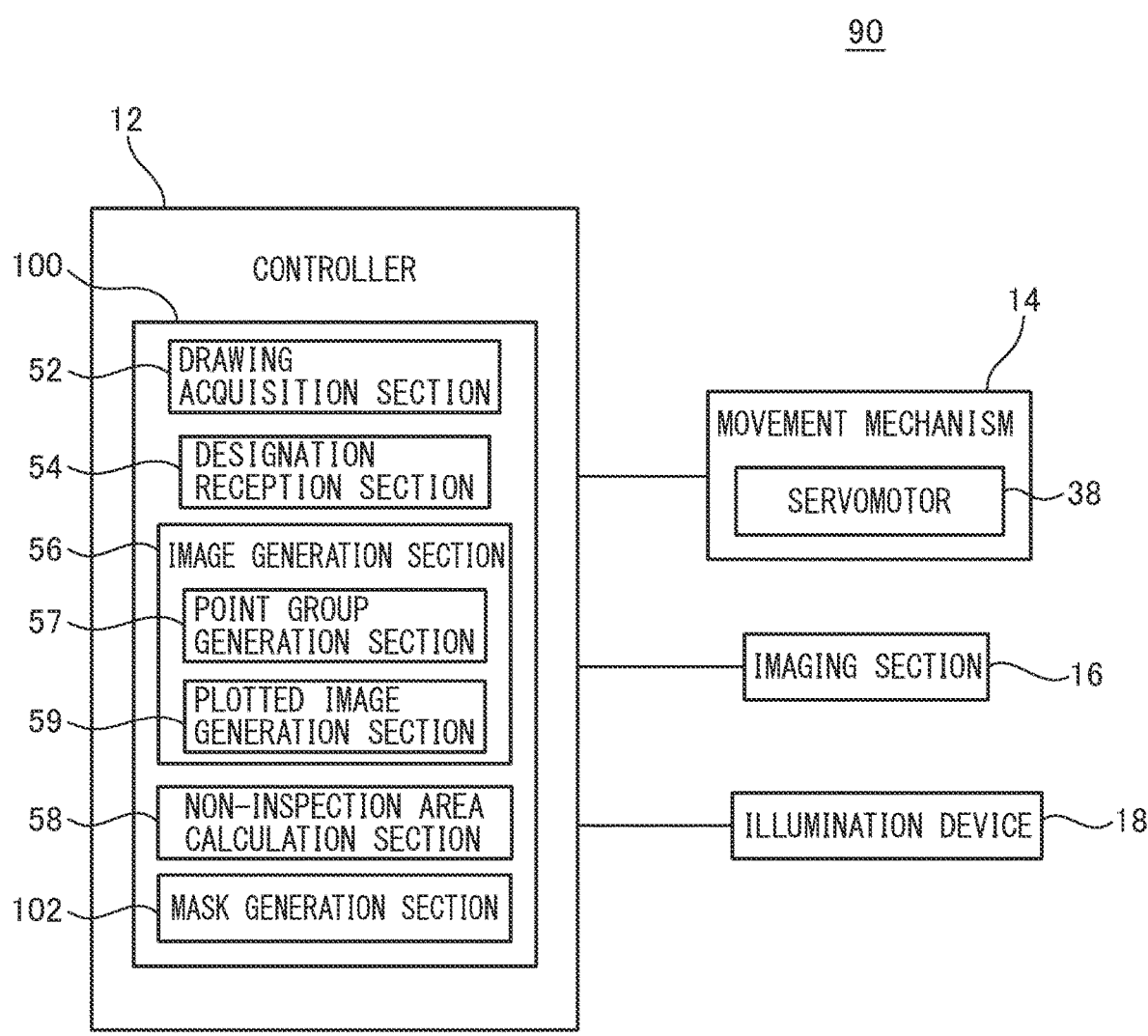
FIG. 15 is a block diagram of an inspection system according to another embodiment.

Next, with reference to FIGS. 1 and 15, an inspection system 90 according to another embodiment will be described. The inspection system 90 includes the controller 12, the movement mechanism 14, the imaging section 16, the illumination device 18, and a device 100. In this embodiment, the device 100 is mounted in the controller 12, and differs from the above-mentioned device 50 in that the device 100 further includes a mask generation section 102.

Figure 16:
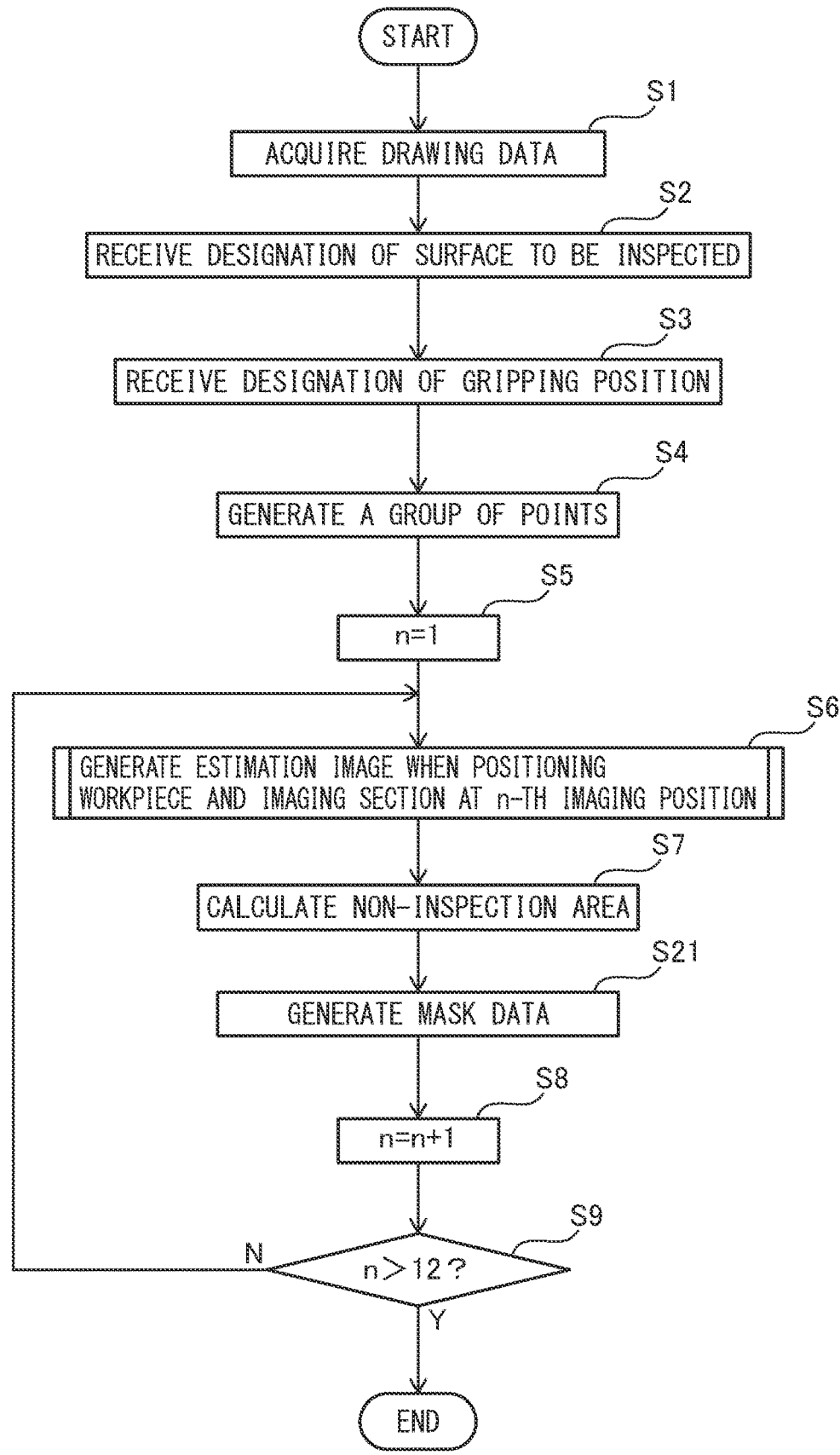
FIG. 16 is a flowchart illustrating an example of an operation flow of a device as illustrated in FIG. 15.

Hereinafter, with reference to FIG. 16, an operation of the device 100 will be described. Note that, in the flow illustrated in FIG. 16, processes similar to those in the flow illustrated in FIG. 8 are assigned the same step numbers, and the detailed descriptions thereof will be omitted. After the flow of FIG. 16 is started, the controller 12 executes steps S1 to S7, similarly to the embodiment as described above.

After step S7, at step S21, the controller 12 generates mask data. The mask data is data for executing a process on an image of the surface $S_I$ (e.g., the image 40 illustrated in FIG. 6), which is imaged by the imaging section 16 in the real space when the inspection system 90 inspects the surface $S_I$, for setting an area (e.g., areas H, E in FIG. 6) other than the surface $S_I$ present in the image to be out of the inspection target.

Hereinafter, a case is described where the imaging section 16 captures the image 40 illustrated in FIG. 6 when the inspection system 90 inspects the surface $S_I$.

As an example, at step S21, the controller 12 deletes every points of the group of points 61' in the estimation image 62 (FIG. 12) generated at step S6, extracts only the non-inspection areas H' and E', and generates mask data in which the extracted non-inspection areas H' and E' are colored in a single color (e.g., black) different from the surface $S_I$.

Figure 17:
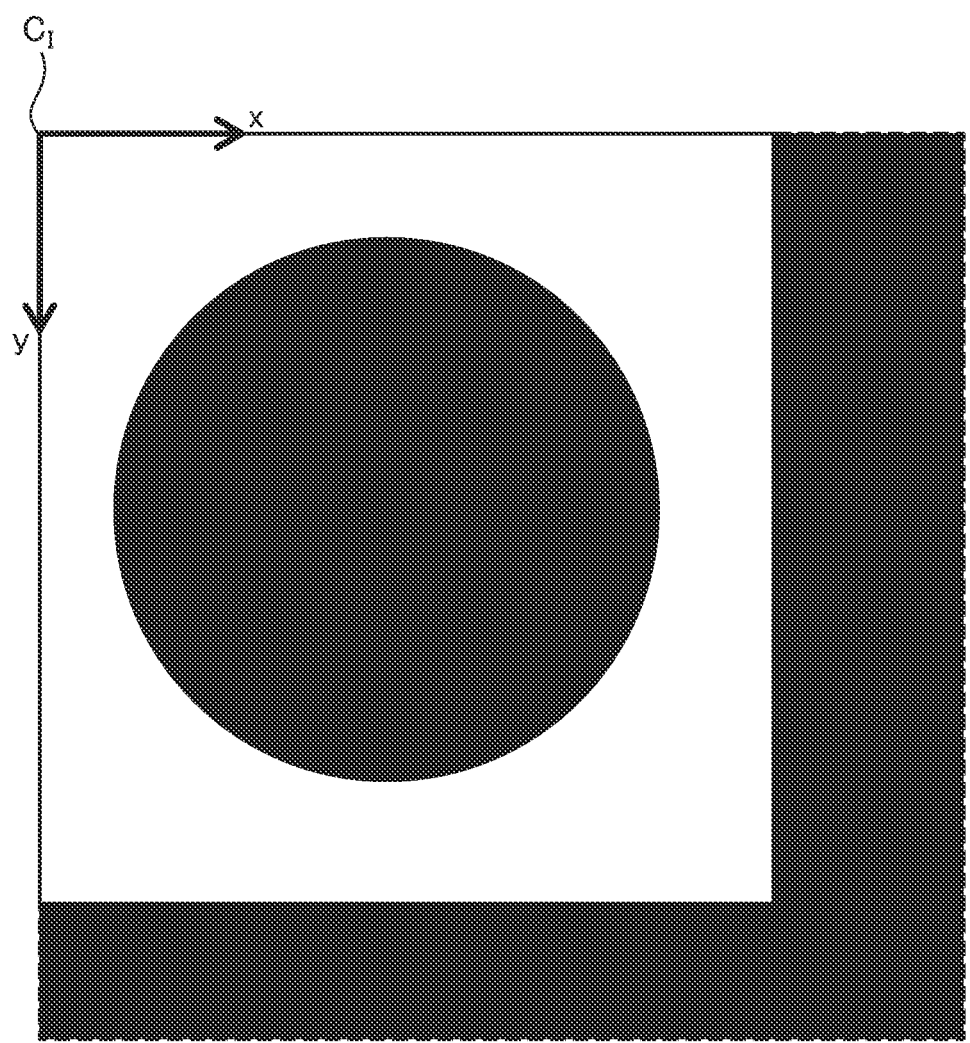
FIG. 17 illustrates an example of mask data generated at step S21 in FIG. 16.

FIG. 17 illustrates an example of such mask data. In the mask data 104 illustrated in FIG. 17, the pixels displaying the non-inspection areas H' and E' are colored in black. The controller 12 stores the generated mask data 104 in the storage.

Then, the controller 12 superposes the mask data 104 generated at step S21 on the image 40 imaged by the imaging section 16 when the surface $S_I$ is inspected. Due to this, the pixels of the image 40 corresponding to the non-inspection areas H' and E' (i.e., pixels displaying the hole H and the exterior space E in FIG. 6) are colored in a single color.

As a result, when the controller 12 analyzes the image 40 in order to detect a defect such as a scratch, the areas of the hole H and the exterior space E in the image 40 are colored in a single color, and therefore no characteristic cannot exist in these areas, thereby no defect such as a scratch can be detected. In this way, the areas H, E in the image 40 unnecessary to be inspected by the inspection system 90 can be substantially excluded from the inspection target.

Further, as another example, the controller 12 may generate mask data for excluding the pixels of the image 40 corresponding to the non-inspection areas H' and E' from a target of image analysis carried out when the surface $S_I$ is inspected.

For example, at this step S21, the controller 12 extracts only the non-inspection areas H' and E' from the estimation image 62 generated at step S6, and generates mask data configured to provide a flag-giving function to the non-inspection areas H' and E'.

Then, the controller 12 superposes the generated mask data on the image 40 imaged by the imaging section 16 when the surface $S_I$ is inspected, and gives flags to the pixels of the image 40 corresponding to the non-inspection areas H' and E' included in the mask data.

In this case, when analyzing the image 40 in order to detect a defect such as a scratch, the controller 12 does not carry out an image analysis for the pixels to which the flags are given. In this way, the areas H, E in the image 40 unnecessary to be inspected by the inspection system 90 can be excluded from the inspection target.

Thus, in this embodiment, the controller 12 functions as the mask generation section 102 (FIG. 15) configured to give to the non-inspection areas H', E' a color different from that of the surface $S_I$ to be inspected, or give to pixels of the non-inspection areas H', E' the flags for setting the non-inspection areas H', E' to be out of the inspection target.

According to this embodiment, the image area unnecessary to be inspected can be excluded from the inspection target with using the non-inspection areas H', E' calculated at step S7, and therefore it is possible to accelerate the inspection operation for the surface $S_I$ by the inspection system 90. Further, since the information-processing volume when the controller 12 analyzes the image upon the inspection can be reduced, it is possible to reduce a load on a resource of the controller 12 (e.g., the CPU).

Next, with reference to FIGS. 2 and 18, an inspection system 110 according to still another embodiment will be described. The inspection system 110 differs from the above-mentioned inspection system 10 in the following configuration.

Specifically, in the inspection system 110, the imaging section 16 is fixed to the wrist 26 of the movement mechanism 14. On the other hand, the workpiece W is fixed to a workpiece-holder 112, and arranged at a predetermined position in the robot coordinate system $C_R$ so as to be separate away from the movement mechanism 14. The storage of the controller 12 pre-stores information on a fixed position of the workpiece W in the robot coordinate system $C_R$.

In this embodiment, a tool coordinate system $C_T$ is set for the imaging section 16. The tool coordinate system $C_T$ is one of coordinate systems of automatic control, and defines a position and orientation of the imaging section 16 in a space by expressing a position and direction of the tool coordinate system $C_T$ in the robot coordinate system $C_R$. In this embodiment, the tool coordinate system $C_T$ is set such that the z-axis of the tool coordinate system $C_T$ coincides with the optical axis O of the imaging section 16.

The controller 12 operates the rotary barrel 22, the robot arm 24, and the wrist 26 in the robot coordinate system $C_R$ such that the position and orientation of the imaging section 16 coincide with those defined by the tool coordinate system $C_T$. In this way, the imaging section 16 is disposed at an arbitrary position and orientation in the robot coordinate system $C_R$.

Next, an outline of an operation of inspecting the surface $S_I$ of the workpiece W by the inspection system 110 will be described. When inspecting the surface $S_I$ of the workpiece W, the controller 12 operates the movement mechanism 14 so as to move the imaging section 16 to an imaging position at which at least a part of the surface $S_I$ is within the field of view A of the imaging section 16, to position the workpiece W and the imaging section 16 relative to each other.

Specifically, the controller 12 sets the tool coordinate system $C_T$ at a first position and direction. Then, the controller 12 operates the movement mechanism 14 so as to move the imaging section 16 such that the position and orientation of the imaging section 16 coincides with a first position and orientation defined by the tool coordinate system $C_T$ set at the first position and direction.

As a result, the imaging section 16 is arranged at the first position and orientation, and thereby, the workpiece W is positioned at a first imaging position with respect to the workpiece W. Then, the controller 12 transmits a command to the illumination device 18 so as to turn on the illumination device 18. Due to this, the workpiece W fixed to the workpiece-holder 112 is illuminated by the illumination device 18.

Then, the controller 12 transmits an imaging command to the imaging section 16. Upon the receipt of the imaging command from the controller 12, the imaging section 16 images the surface $S_I$ of the workpiece W. FIG. 6 illustrates an example of an image captured by the imaging section 16 when the imaging section 16 is positioned at the first imaging position with respect to the workpiece W.

The image 40 illustrated in FIG. 6 is an image within the field of view A of the imaging section 16 when the imaging section 16 and the workpiece W are positioned at the first imaging position. Each pixel of the image 40 captured by the imaging section 16 is expressed by the imaging section coordinate system $C_I$ in FIG. 6.

The position and direction of the imaging section coordinate system $C_I$ in the robot coordinate system $C_R$ can be obtained from the position, the visual line direction and the view angle of the imaging section 16 in the robot coordinate system $C_R$.

Then, the controller 12 operates the movement mechanism 14 so as to arrange the imaging section 16 at a second position and orientation. Thereby, the imaging section 16 is positioned at a second imaging position with respect to the workpiece W. When the imaging section 16 is positioned at the second imaging position with respect the workpiece W, the field of view A of the imaging section 16 is disposed at the position indicated by the area $A_2$ in FIG. 7 with respect to the surface $S_I$.

When the imaging section 16 and the workpiece W are disposed at the second imaging position, the controller 12 transmits an imaging command to the imaging section 16 so as to image the surface $S_I$ of the workpiece W. Thereby, an image corresponding to the area $A_2$ in FIG. 7 is captured.

Similarly, the controller 12 sequentially disposes the imaging section 16 at a third position and orientation, a fourth position and orientation, . . . and an n-th position and orientation, thereby, sequentially positions the imaging section 16 at a third imaging position, a forth imaging position, . . . and an n-th imaging position, with respect to the workpiece W. The controller 12 causes the imaging section 16 to image the surface $S_f$ of the workpiece W each time the imaging section 16 and the workpiece W are positioned at the respective imaging positions.

In this way, the controller 12 acquires 12 a total of twelve images corresponding to the areas $A_1$ to $A_{12}$ in FIG. 7. Then, the controller 12 analyzes each image acquired from the imaging section 16 so as to detect a defect, such as a scratch formed on the surface $S_f$.

Next, with reference to FIGS. 19 and 20, a function of the device 50 provided in the inspection system 110 will be described. Note that, in the flow illustrated in FIG. 19, processes similar to those in the flow illustrated in FIG. 8 are assigned the same step numbers, and the detailed description thereof will be omitted.

After step S2, at step S3', the controller 12 receives designation of the fixed position of the workpiece W in the robot coordinate system $C_R$. For example, the operator operates the operation section of the controller 12 so as to input a parameter which defines the position of the workpiece W in the robot coordinate system $C_R$.

Figure 18:
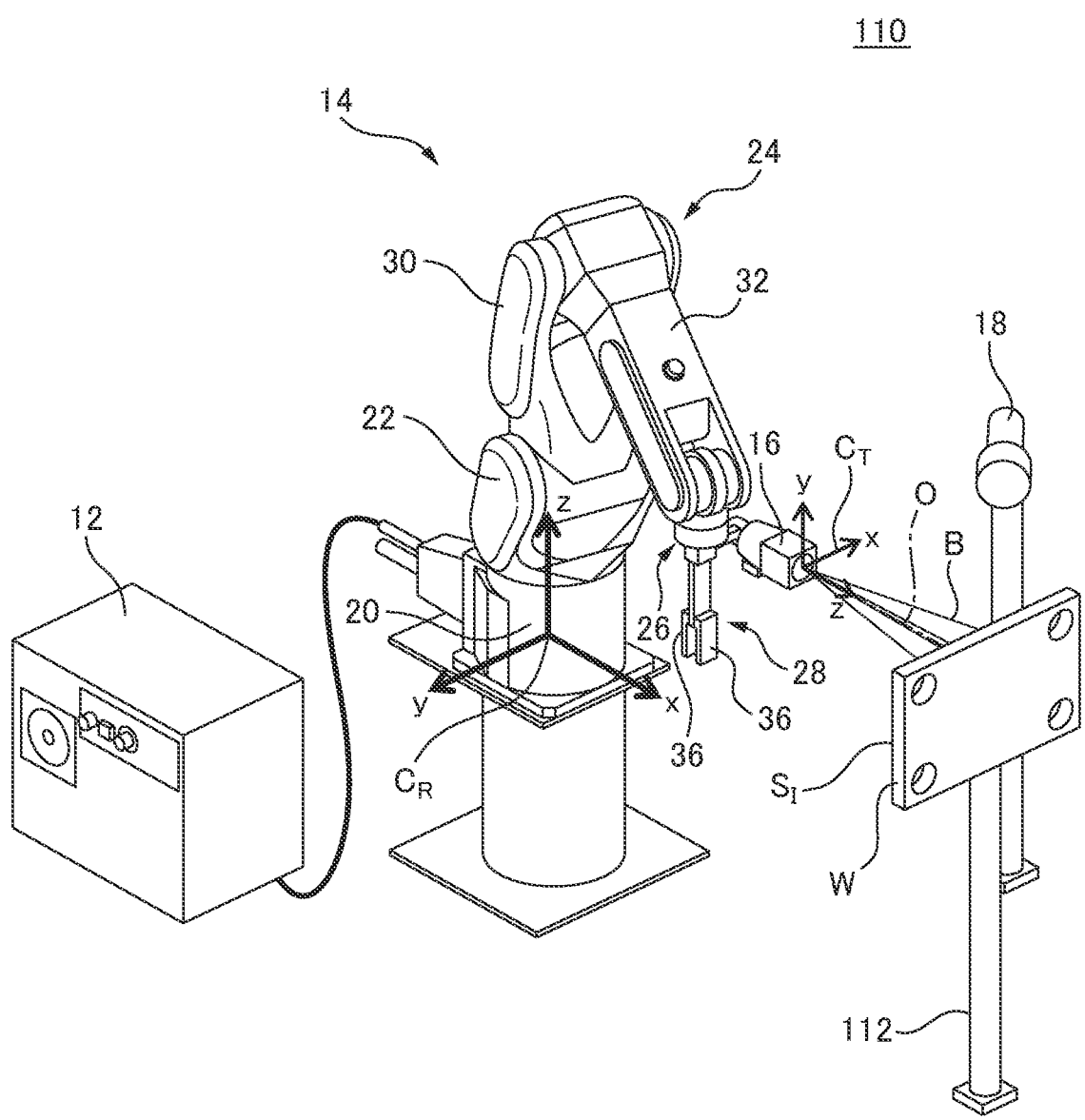
FIG. 18 is a perspective view of an inspection system according to still another embodiment.

Specifically, in the embodiment illustrated in FIG. 18, the workpiece W is fixed such that the surface $S_f$ of the workpiece W is parallel to the y-z plane of the robot coordinate system $C_R$ and the workpiece W is disposed at a position separate from the origin of the robot coordinate system $C_R$ in the x-axis positive direction by a predetermined distance.

The operator operates the operation section of the controller 12 so as to input a parameter (e.g., the angle of the surface $S_f$, the distance from the origin) which defines the position of the workpiece W in the robot coordinate system $C_R$. The controller 12 receives the input to the operation section by the operator, and acquires the fixed position of the workpiece W in the robot coordinate system $C_R$.

At step S5', the controller 12 sets the number "n" of the n-th imaging position (i.e., the n-th position and orientation at which the imaging section 16 is disposed, and the n-th position and direction at which the tool coordinate system $C_T$ is set) to "1".

At step S6', the controller 12 generates, on the basis of the drawing data of the workpiece W (the workpiece model $W_M$), an estimation image which is estimated to be imaged by the imaging section 16 when the movement mechanism 14 positions the imaging section 16 at the n-th imaging position with respect to the workpiece W.

This S6' will be described with reference to FIG. 20. Note that, in the flow illustrated in FIG. 20, processes similar to those in the flow illustrated in FIG. 11 are assigned the same step numbers, and the detailed description thereof will be omitted. Hereinafter, a case is described where the number "n" of the n-th imaging position is set to "1" (step S5) at the start of this step S6'.

After step S6' is started, at step S12', the controller 12 calculates a coordinate in the robot coordinate system $C_R$ of each point of the group of points 61 generated at step S4. In this regard, at the above-mentioned step S3', the fixed position of the workpiece W in the robot coordinate system $C_R$ is designated.

Accordingly, on the basis of the fixed position of the workpiece W in the robot coordinate system $C_R$ and the group of points 61 generated at step S4, the controller 12 can calculate the coordinate in the robot coordinate system $C_R$ of each point of the group of points 61 corresponding to the surface $S_f$ fixed at the fixed position. Then, the controller 12 assigns each point, for which the coordinate has been calculated, with the number "m" (m=1 to γ).

At step S14', the controller 12 transforms (i.e., projects) the coordinate of the m-th point of the group of points 61, for which the coordinates have been calculated at step S12', into a coordinate in the imaging section coordinate system $C_I$.

The imaging section coordinate system $C_I$ at this time can be determined from information on the first position and direction at which the tool coordinate system $C_T$ is set, and from the visual line direction (i.e., the z-axis of the tool coordinate system $C_T$) and the view angle of the imaging section 16.

The controller 12 multiplies the coordinate of the point calculated at step S12' by a transformation matrix so as to transform the coordinate in the robot coordinate system $C_R$ of the point into that in the imaging section coordinate system $C_I$. This transformation matrix is a matrix for transforming a coordinate in the robot coordinate system $C_R$ into that in the imaging section coordinate system $C_I$.

Figure 20:
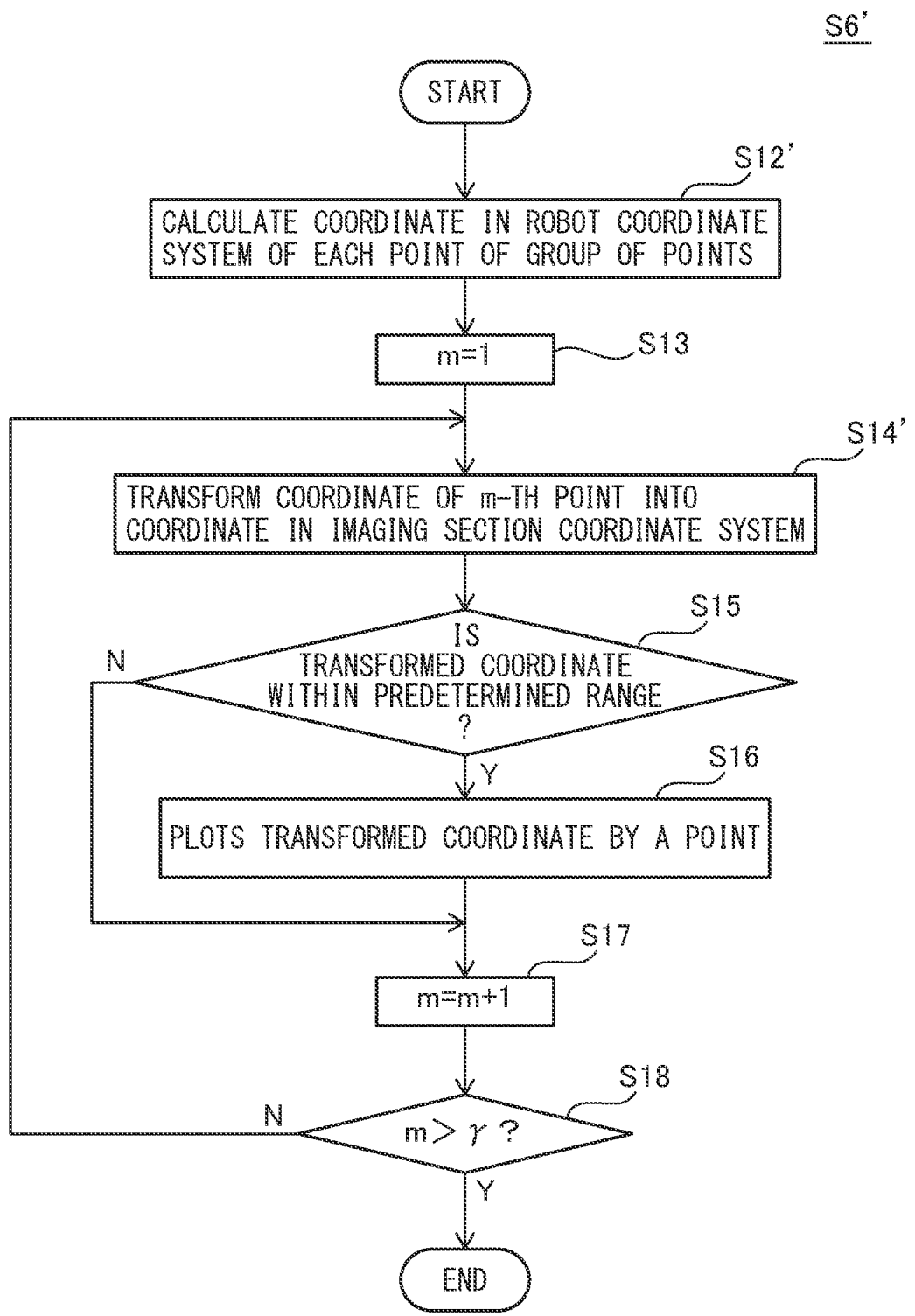
FIG. 20 is a flowchart illustrating an example of an operation flow of step S6' in FIG. 19.

Then, the controller 12 loops steps 14' to 18 until it determines YES at step S18 in FIG. 20, and generates the estimation image 62 illustrated in FIG. 12.

Figure 19:
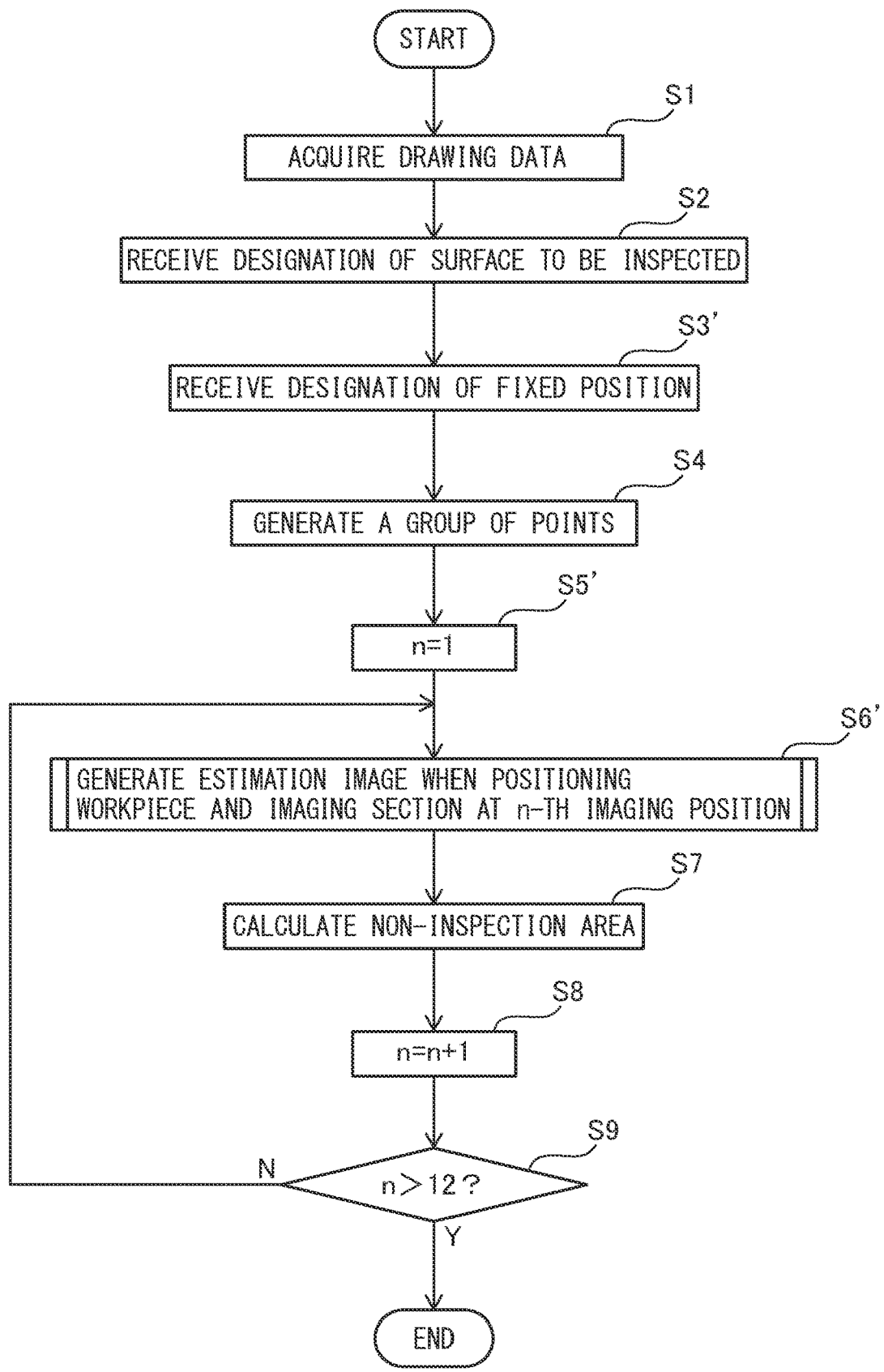
FIG. 19 is a flowchart illustrating an example of an operation flow of a device as illustrated in FIG. 18.

Then, the controller 12 loops steps 6' to 9 until it determines YES at step S9 in FIG. 19. Thereby, the controller 12 sequentially generates the estimation images within the field of view A of the imaging section 16, each of which corresponds to the area $A_n$ (n=1 to 12) in FIG. 7, and calculates the non-inspection area in each of the estimation images.

Thus, according to this embodiment, since the controller 12 can calculate, from the drawing data of the workpiece W, the non-inspection areas H', E', similarly to the above-mentioned embodiment, it is possible to omit an operation in which the operator manually sets the non-inspection area for each field of view A. Accordingly, the number of processes necessary for starting up the inspection system 110 can be reduced.

Next, with reference to FIG. 21, an inspection system 120 according to still another embodiment will be described. The inspection system 120 differs from the above-mentioned inspection system 10 in that the inspection system 120 includes a device 130. The device 130 according to this embodiment includes the drawing acquisition section 52, the designation reception section 54, and a non-inspection area calculation section 132.

The device 130 is mounted in the controller 12. Therefore, the controller 12 functions as the drawing acquisition section 52, the designation reception section 54, and the non-inspection area calculation section 132. In this embodiment, the controller 12 generates the group of points 61 described above, and determines whether or not a visual line of each imaging element of the image sensor built in the imaging section 16 passes a point of the group of points 61, in order to calculate a non-inspection area.

Figure 24:
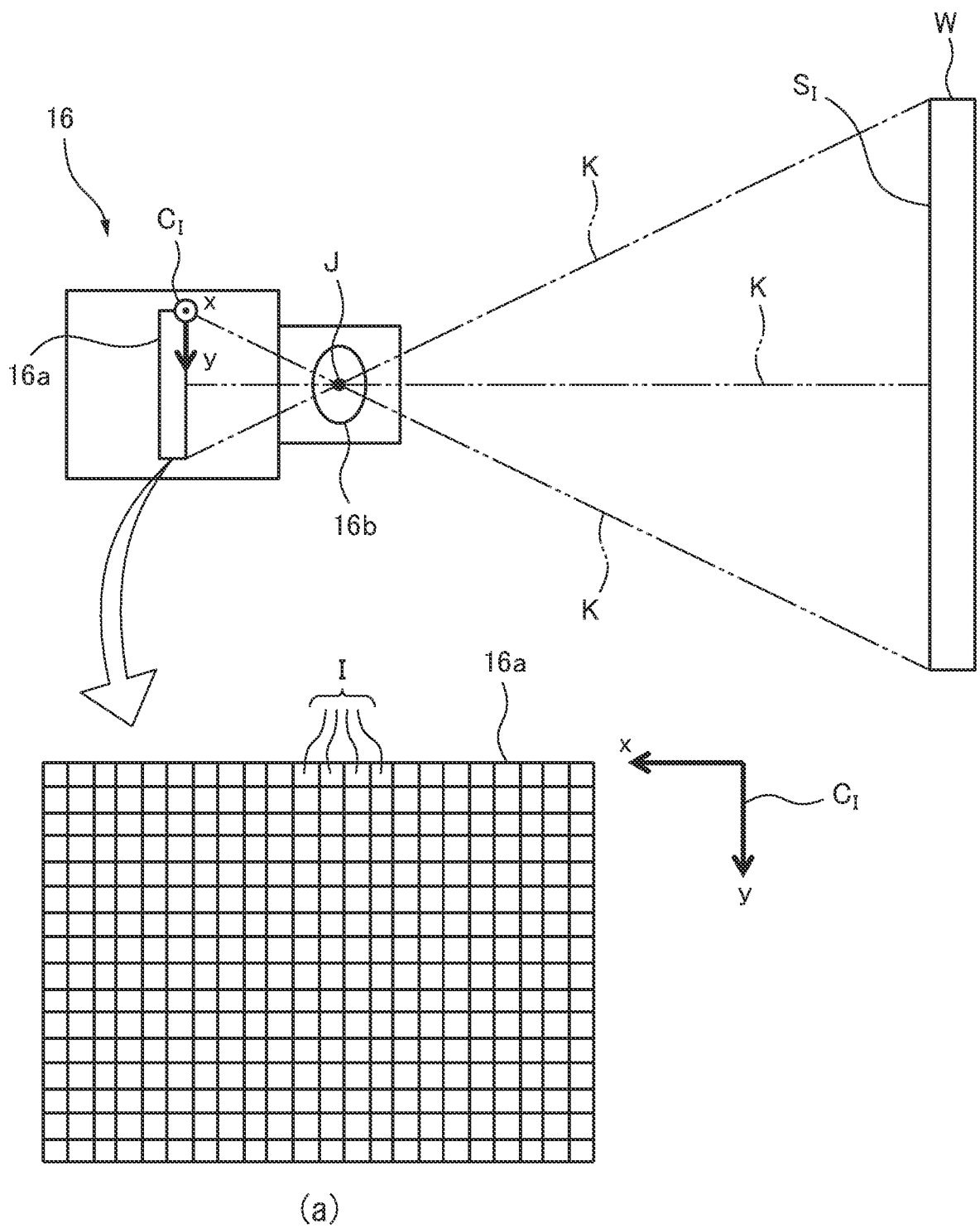
FIG. 24 is a diagram for illustrating a visual line of each imaging element of the imaging section as illustrated in FIG. 21.

Hereinafter, with reference to FIG. 24, the visual line of the imaging element will be described. The area (a) in FIG. 24 is an enlarged view in which a part of a light reception surface of an image sensor 16a is enlarged. The imaging section 16 includes the image sensor 16a and an optical system 16b having at least one lens. As illustrated in the area (a) in FIG. 24, the image sensor 16a includes a plurality of imaging elements I disposed so as to align in the x-axis and the y-axis directions of the imaging section coordinate system $C_I$.

Each of the imaging elements I has a visual line K. The visual line K coincides with a virtual line connecting each imaging element I and a focal point J. Coordinates of each imaging element I and the focal point J in the robot coordinate system $C_R$ can be obtained from e.g. the fixed position of the imaging section 16 in the robot coordinate system $C_R$ and the drawing data of the imaging section 16. Further, a coordinate (or a function) of the visual line K of each imaging element I in the robot coordinate system $C_R$ can be obtained from the coordinates of each imaging element I and the focal point J in the robot coordinate system $C_R$.

The controller 12 calculates the visual line K of each imaging element I, and determines whether or not the visual line K passes a point of the generated group of points 61, thereby calculates the non-inspection areas H, E included in the image (FIG. 6) within the field of view A of the imaging section 16 when the workpiece W is positioned at the n-th imaging position with respect to the imaging section 16.

Figure 22:
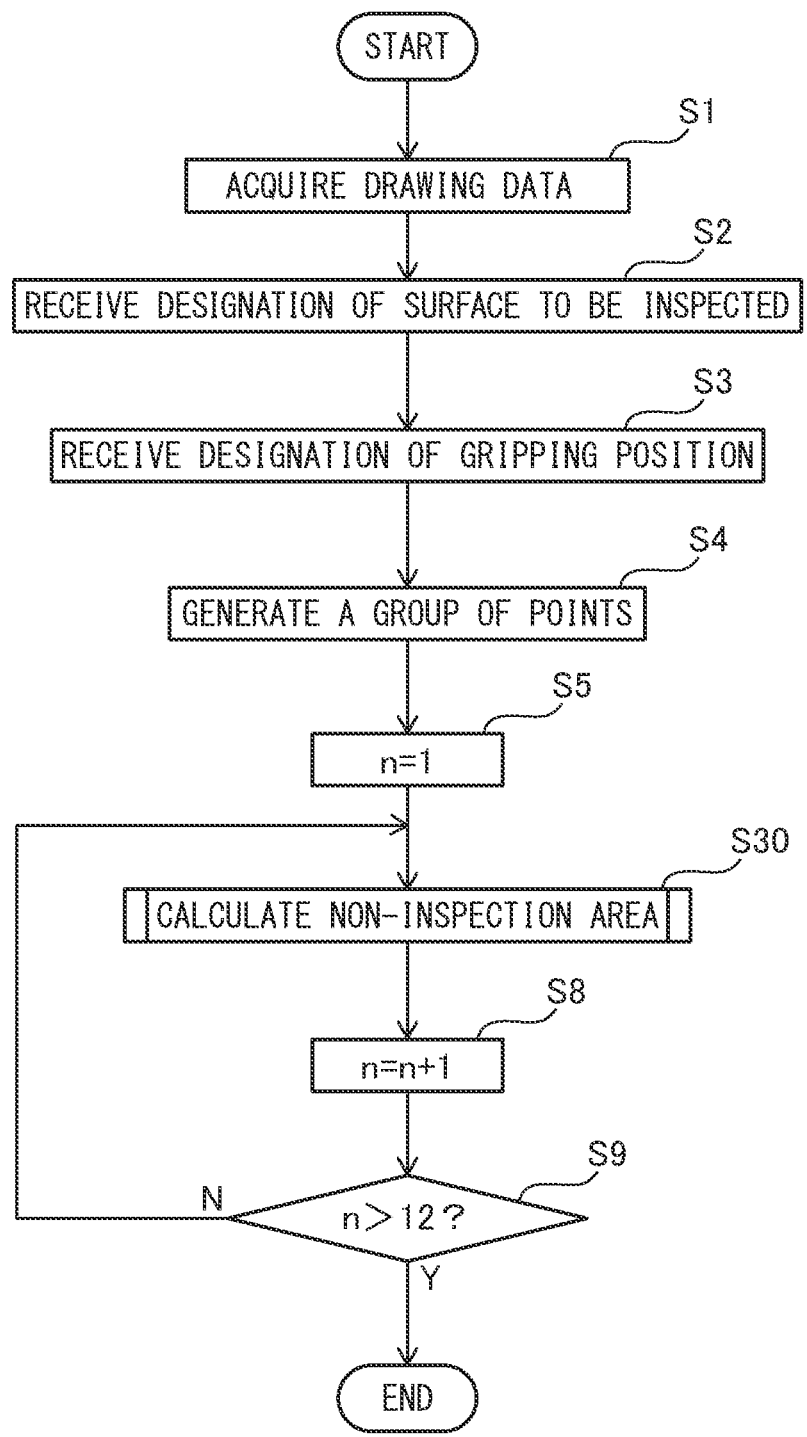
FIG. 22 is a flowchart illustrating an example of an operation flow of a device as illustrated in FIG. 21.

Hereinafter, with reference to FIG. 22, an operation flow of the device 130 will be described. Note that, in the flow illustrated in FIG. 22, processes similar to those in the flow illustrated in FIG. 8 are assigned the same step numbers, and the detailed description thereof will be omitted. After the flow in FIG. 22 is started, the controller 12 executes steps S1 to S5, similarly to the above-mentioned embodiment.

After step S5, at step S30, the controller 12 calculates a non-inspection area. This step S30 will be described with reference to FIG. 23. Note that, in the flow illustrated in FIG. 23, processes similar to those in the flow illustrated in FIG. 11 are assigned the same step numbers, and the detailed description thereof will be omitted.

Figure 23:
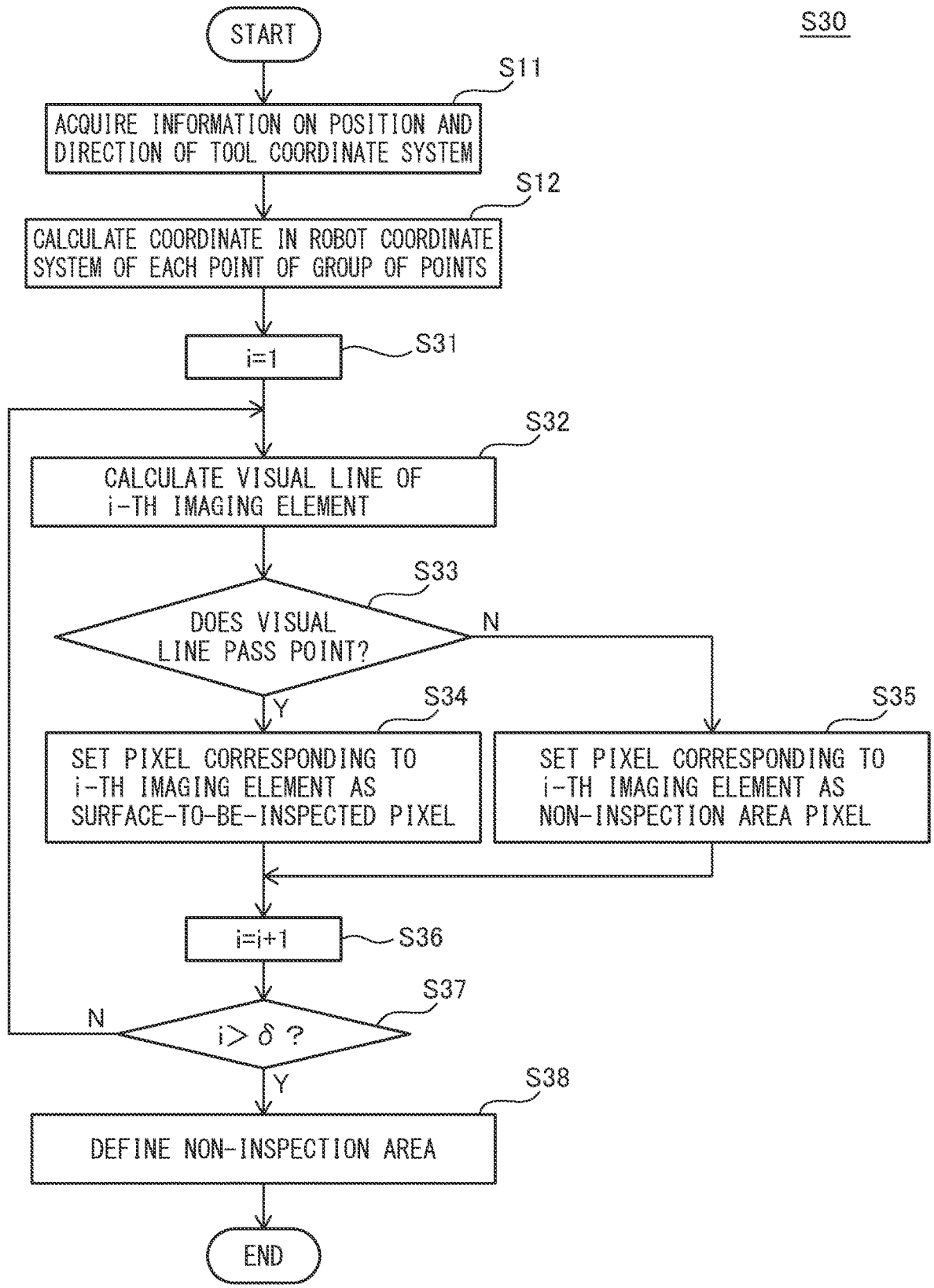
FIG. 23 is a flowchart illustrating an example of an operation flow of step S30 in FIG. 22.

After the flow illustrated in FIG. 23 is started, the controller 12 executes the above-mentioned step S11. Specifically, the controller 12 acquires information on the n-th position and direction of the tool coordinate system $C_T$ set when the workpiece W is positioned at the n-th imaging position with respect to the imaging section 16.

Then, the controller 12 executes the above-mentioned step S12. Specifically, the controller 12 calculates the coordinate in the robot coordinate system $C_R$ of each point of the group of points 61 when the tool coordinate system $C_T$ is disposed at the n-th position and direction.

At step S31, the controller 12 sets the number "i" assigned to the respective imaging elements I to "1". For example, if the image sensor 16a of the imaging section 16 includes a total of $10^7$ of the imaging elements I, each of the imaging elements I is assigned with the number "i" of any of 1 to $10^7$.

At step S32, the controller 12 calculates a visual line $K_i$ of the i-th imaging element I. For example, if the number "i" of the imaging element I is set to "100" (i.e., i=100) at the start of this step S32, the controller 12 calculates a visual line $K_{100}$ of the 100th imaging element I.

As described above, the controller 12 can determine the coordinates of the i-th imaging element I and the focal point J in the robot coordinate system $C_R$ from the fixed position of the imaging section 16 in the robot coordinate system $C_R$ and the drawing data of the imaging section 16, etc.

From these coordinates, the controller 12 can calculate the coordinate (or function) of the visual line $K_i$ in the robot coordinate system $C_R$. The controller 12 stores the calculated coordinate (or function) of the visual line $K_i$ in the storage.

At step S33, the controller 12 determines whether or not the visual line $K_i$ calculated at step S32 passes one point of the group of points 61 generated at step S4. Specifically, the controller 12 determines whether or not the visual line $K_i$ passes one point of the group of points 61, on the basis of the coordinate in the robot coordinate system $C_R$ (or the function) of the visual line $K_i$ calculated at step S32 and the coordinate in the robot coordinate system $C_R$ of each point of the group of points 61 calculated at step S12.

When the controller 12 determines that the visual line $K_i$ passes a point of the group of points 61 (i.e., determines YES), it proceeds to step S34. On the other hand, when the controller 12 determines that the visual line $K_i$ does not pass any point of the group of points 61 (i.e., determines NO), it proceeds to step S35.

When the controller 12 determines YES at step S33, at step S34, the controller 12 sets the i-th pixel imaged by the i-th imaging element I when the workpiece W is disposed at the n-th imaging position relative to the imaging section 16, as a surface-to-be-inspected pixel which displays the surface $S_I$ to be inspected.

On the other hand, when determining NO at step S33, at step S35, the controller 12 sets the i-th pixel imaged by the i-th imaging element I when the workpiece W is disposed at the n-th imaging position relative to the imaging section 16, as a non-inspection area pixel which displays the non-inspection areas H, E.

At step S36, the controller 12 increments the number "i" of the i-th imaging element I by "1" (i.e., i=i+1). At step S37, the controller 12 determines whether or not the number "i" is a value greater than the total number "δ" of the imaging elements I (e.g., $δ=10^7$).

When the controller 12 determines that the number "i" is greater than the total number "δ" (i.e., determines YES), it proceeds to step S38. On the other hand, when the controller 12 determines that the number "i" is equal to or less than the total number "δ" (i.e., determines NO), it returns to step S32.

In this way, the controller 12 loops steps S32 to S37 until it determines YES at step S37. Thereby, the controller 12 determines, for every imaging elements I, whether or not the visual line $K_i$ thereof passes a point of the group of points 61, and sets the pixel constituting the image within the field of view A of the imaging section 16 at the n-th imaging position, as the surface-to-be-inspected pixel or the non-inspection area pixel.

At step S38, the controller 12 defines the non-inspection area. Specifically, on the basis of the setting (the surface-to-be-inspected pixel or the non-inspection area pixel) of the i-th pixel (i=1 to δ), the controller 12 defines the non-inspection area (e.g., the areas H, E) included in the image (i.e., the image constituted by the first to δ-th pixels) within the field of view A of the imaging section 16 when the workpiece W is positioned at the n-th imaging position relative to the imaging section 16.

As an example, the controller 12 calculates the number of the surface-to-be-inspected pixels per a unit region (e.g., a region of 10 pixels×10 pixels) in the image of the field of view A of the imaging section 16, and determines that the unit region is the non-inspection area H, E when the number is equal to or less than a predetermined threshold value.

The controller 12 can calculate the non-inspection areas H, E by executing such operation over the entire image within the field of view A. Thus, in this embodiment, the controller 12 functions as the non-inspection area calculation section 132 configured to calculate the non-inspection areas H and E.

According to this embodiment, the controller 12 can calculate the non-inspection areas H and E on the basis of the visual line K of the imaging elements I, without generating the estimation image 62 described above.

Note that, since the visual line $K_i$ of each imaging element I corresponds to a subject image entering the imaging element I, the coordinate (or function) of the visual line $K_i$ of each imaging element I in the robot coordinate system $C_R$ may be calculated not as a line but as a beam (e.g., a cylindrical beam) having a predetermined sectional area. Alternatively, a point of the group of points 61 may be a closed area (e.g., a circle) having a predetermined size.

Figure 21:
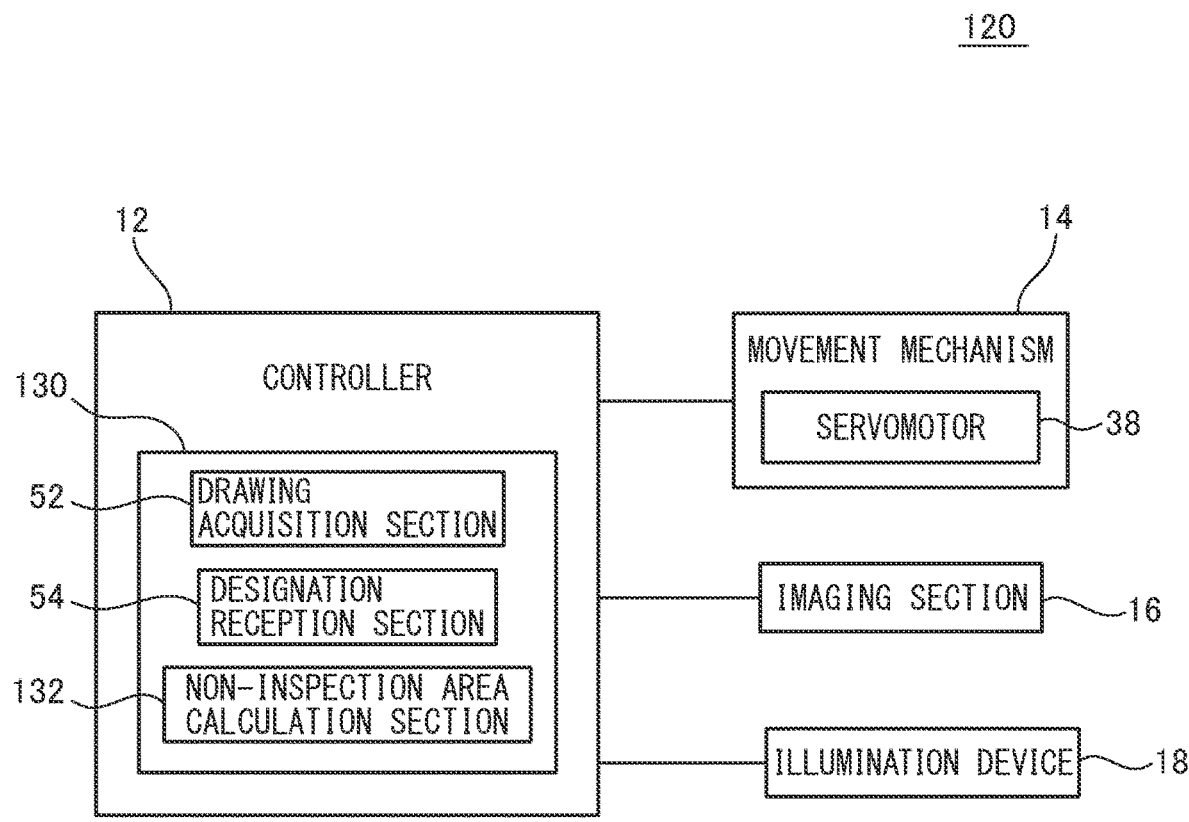
FIG. 21 is a perspective view of an inspection system according to still another embodiment.

Further, a person skilled in the art may easily understand that the technical idea of the device 130 illustrated in FIG. 21 is also applicable to the inspection system illustrated in FIG. 18 (i.e., the embodiment in which the imaging section 16 is fixed to the wrist 26).

Note that, the controller 12 may simulatively carry out the function of the device 50, 100, or 130 with using a simulation software or the like. Specifically, the controller 12 arranges a three-dimensional model of the components of the inspection system 10 (i.e., the robot base 20, the rotary barrel 22, the robot arm 24, the wrist 26, and the robot hand 28) and the workpiece model $W_M$ in a virtual space.

Then, the controller 12 simulatively positions the workpiece model $W_M$ and a three-dimensional model of the imaging section 16 in the virtual space such that the surface model $S_{IM}$ is within a virtual field of view A of the three-dimensional model of the imaging section 16.

Then, the controller 12 simulatively images the surface model $S_{IM}$ by the three-dimensional model of the imaging section 16, and generates an estimation image within the virtual field of view A. Then, the controller 12 calculates a non-inspection area from the generated estimation image. According to such a simulative method, it is possible to calculate the non-inspection area, similarly to the above-mentioned embodiments.

Further, an image area to be out of the inspection target of the inspection system 10, 90, 110, 120 (i.e., a non-inspection area) may be optionally set. Specifically, in the inspection system 10 or 90, the finger 36 on the surface $S_I$ is projected in the image within the field of view A of the imaging section 16 in a real space when the robot hand 28 grips the workpiece W.

In this case, the controller 12 excludes an area on the surface $S_I$ on which the finger 36 is disposed from a target to which a group of points is provided when the group of points 61 is generated at step S4 in FIG. 8. The area on the surface $S_I$ on which the finger 36 is disposed can be determined from the drawing data of the finger 36, the drawing data of the workpiece W, and the gripping position at which the robot hand 28 grips the workpiece W.

Due to this, at the above-mentioned step S7, the controller 12 can calculate an image area of the surface $S_I$ on which the finger 36 is disposed as a non-inspection area. As a result, it is possible to set this image area to be out of the inspection target of the inspection system 10.

Further, in the above mentioned embodiments, the image generation section 56 generates the group of points 61, 66, 68, 70, 72, 74, 76, 78, 80 (step S4), the group of points 61, 66, 68, 70, 72, 74, 76, 78, 80 are transformed into the imaging section coordinate system $C_I$ (steps 14, 14') to generate the estimation images 62, 82.

However, the image generation section 56 may create a 3D model of the surface $S_I$ (i.e., the surface model $S_{IM}$) in the robot coordinate system $C_R$ when the tool coordinate system $C_T$ is disposed at the n-th position and direction, and transform the surface model $S_{IM}$ disposed in the robot coordinate system $C_R$ into the imaging section coordinate system $C_I$ so as to generate an estimation image within the field of view A of the imaging section 16. In this case, the controller 12 can generate an estimation image which substantially coincides with the image 40 illustrated in FIG. 6.

Further, in the above-mentioned embodiments, the devices 50, 100 are mounted in the controller 12. However, the device 50 or 100 may be configured as an element separate from the controller 12.

Figure 25:
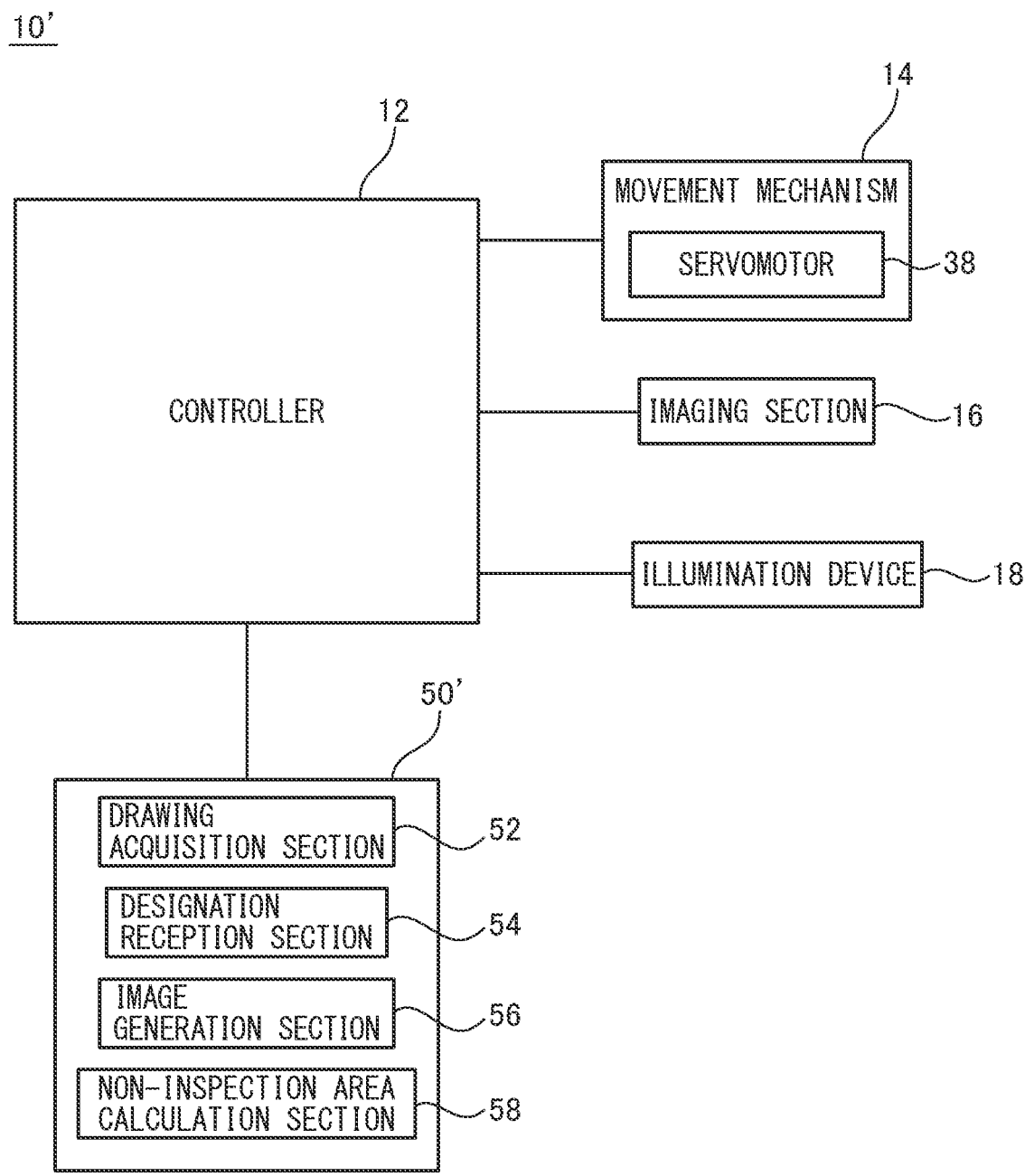
FIG. 25 is a perspective view of an inspection system according to still another embodiment.

Such an embodiment is illustrated in FIG. 25. The inspection system 10' illustrated in FIG. 25 includes the controller 12, the movement mechanism 14, the imaging section 16, the illumination device 18, and a device 50'.

In this embodiment, the device 50' is configured as an element separate from the controller 12, and communicably connected to the controller 12. Similarly to the above-mentioned device 50, the device 50' carries out the flows illustrated in FIGS. 8 and 11 to calculate the non-inspection area.

Similarly, the device 130 illustrated in FIG. 21 may be configured as an element separate from the controller 12. Further, the illumination device 18 may be omitted from the inspection system 10, 10', 90, 110, or 130 described above, wherein the surface $S_I$ may be illuminated by e.g. natural light.

Further, in the embodiments described above, the movement mechanism 14 is comprised of a vertical articulated robot. However, the movement mechanism 14 may be comprised of a loader or the like.

Further, the device 50, 50', 100, or 130 described above may be comprised of one computer having e.g. a CPU and storage. Alternatively, each of the drawing acquisition section 52, the designation reception section 54, the image generation section 56 (the point group generation section 57, the plotted image generation section 59), the non-inspection area calculation section 58 and 132, and the mask generation section 102 may be comprised of one computer having e.g. a CPU and a storage.

This disclosure has been described above through embodiments, but the embodiments as described above are not to limit the invention as in the claims.

The invention claimed is:

1. A device configured to calculate an image area to be excluded from an inspection target of an inspection system for inspecting a workpiece surface, the inspection system including an imaging section configured to image a workpiece and a movement mechanism configured to move the workpiece or the imaging section so as to position the workpiece and the imaging section relative to each other, the device comprising a processor configured to:
   acquire CAD data of a workpiece model which models the workpiece,
   receive selection of a surface model to be inspected included in the workpiece model, in the CAD data,
   additionally generate data of a group of points, which is different from the CAD data, on the surface model, on the basis of the CAD data, and
   obtain coordinate data of the group of points in a movement mechanism coordinate system for controlling the movement mechanism when the workpiece and the imaging section are positioned at an imaging position at which at least a part of a surface-to-be-inspected, which corresponds to the surface model, is within a field of view of the imaging section,
   transform the coordinate data in the movement mechanism coordinate system into an imaging section coordinate system which defines the field of view of the imaging section positioned at the imaging position, so as to plot each of the group of points in the imaging section coordinate system, and generate an estimation image in the field of view, wherein the estimation image is an image which is estimated to be imaged by the imaging section when the workpiece and the imaging section are positioned at the imaging position, and calculate, as a non-inspection area, an image area other than the surface-to-be-inspected and included in the generated estimation image.

2. The device according to claim 1, wherein
the processor is further configured to generate, on the basis of the CAD data, an estimation image in the field of view, wherein the estimation image is an image estimated to be imaged by the imaging section when the workpiece and the imaging section are positioned at the imaging position, wherein the processor is configured to:
generate the data of the group of points on the surface model, on the basis of the CAD data, and
generate the estimation image by plotting each point generated on at least a part of the surface model to be inspected, and
wherein the processor is configured to calculate, as the non-inspection area, an image area which is other than the surface-to-be-inspected, and is included in the generated estimation image.

3. A device configured to calculate an image area to be excluded from an inspection target of an inspection system for inspecting a workpiece surface, the inspection system including an imaging section configured to image a workpiece and a movement mechanism configured to move the workpiece or the imaging section so as to position the workpiece and the imaging section relative to each other, the device comprising a processor configured to:
acquire CAD data of a workpiece model which models the workpiece,
receive selection of a surface model to be inspected included in the workpiece model, in the CAD data,
additionally generate data of a group of points, which is different from the CAD data, on the surface model, on the basis of the CAD data, and
obtain coordinate data of the group of points in a movement mechanism coordinate system for controlling the movement mechanism when the workpiece and the imaging section are positioned at an imaging position at which at least a part of a surface-to-be-inspected, which corresponds to the surface model, is within a field of view of the imaging section,
determine whether or not a visual line of each of a plurality of imaging elements in the movement mechanism coordinate system, passes a point constituting the group of points on the surface model when the workpiece and the imaging section are positioned at the imaging position, on the basis of the coordinate data of the group of points and coordinate data of the visual line in the movement mechanism coordinate system, and
calculate the non-inspection area, on the basis of the surface-to-be-inspected and the non-inspection area constituting the image within the field of view of the imaging section when the workpiece and the imaging section are positioned at the imaging position, the surface-to-be-inspected on the workpiece model corresponding to the plurality of imaging elements having the visual line determined to pass the point of the group of points, and the non-inspection area corresponding to the plurality of imaging elements having the visual line determined to not pass the point of the group of points.

4. The device according to claim 1, wherein
the processor is further configured to give to the non-inspection area a color different from the surface-to-be-inspected, or give to a pixel of the non-inspection area a flag for setting the non-inspection area to be excluded from the inspection target.

5. An inspection system comprising the device according to claim 1.

6. The inspection system according to claim 5, wherein the imaging section is fixed to the movement mechanism and configured to be moved by the movement mechanism relative to the workpiece.

7. The device according to claim 1, wherein
the processor is configured to calculate the non-inspection area in the image within the field of view of the imaging section for each of a plurality of imaging positions when the workpiece and the imaging section are positioned at the plurality of imaging positions at which each of a plurality of areas of the surface-to-be-inspected different from each other is within the field of view of the imaging section.

8. The inspection system according to claim 5, wherein the movement mechanism is configured to hold the workpiece at a predetermined gripping position and move the workpiece relative to the imaging section.

9. A method of calculating an area to be excluded from an inspection target of an inspection system for inspecting a workpiece surface, the inspection system including an imaging section configured to image a workpiece and a movement mechanism configured to move the workpiece or the imaging section so as to position the workpiece and the imaging section relative to each other, the method comprising:
acquiring CAD data of a workpiece model which models the workpiece;
receiving selection of a surface model to be inspected included in the workpiece model, in the CAD data;
additionally generating data of a group of points, which is different from the CAD data, on the surface model, on the basis of the CAD data; and
obtaining coordinate data of the group of points in a movement mechanism coordinate system for controlling the movement mechanism when the workpiece and the imaging section are positioned at an imaging position at which at least a part of a surface-to-be-inspected, which corresponds to the surface model, is within a field of view of the imaging section,
transforming the coordinate data in the movement mechanism coordinate system into an imaging section coordinate system which defines the field of view of the imaging section positioned at the imaging position, so as to plot each of the group of points in the imaging section coordinate system, and generating an estimation image in the field of view, wherein the estimation image is an image which is estimated to be imaged by the imaging section when the workpiece and the imaging section are positioned at the imaging position, and
calculating, as a non-inspection area, an image area other than the surface-to-be-inspected and included in the generated estimation image.

* * * * *